(12) United States Patent
Park et al.

(10) Patent No.: US 11,516,490 B2
(45) Date of Patent: Nov. 29, 2022

(54) METHOD AND DEVICE FOR INTER PREDICTING ON BASIS OF DMVR

(71) Applicant: LG ELECTRONICS INC., Seoul (KR)

(72) Inventors: Naeri Park, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 17/258,659

(22) PCT Filed: Jul. 15, 2019

(86) PCT No.: PCT/KR2019/008691
§ 371 (c)(1),
(2) Date: Jan. 7, 2021

(87) PCT Pub. No.: WO2020/017840
PCT Pub. Date: Jan. 23, 2020

(65) Prior Publication Data
US 2021/0274205 A1 Sep. 2, 2021

Related U.S. Application Data

(60) Provisional application No. 62/698,894, filed on Jul. 16, 2018.

(51) Int. Cl.
*H04N 19/176* (2014.01)
*H04N 19/105* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/44; H04N 19/105; H04N 19/132; H04N 19/137; H04N 19/176; H04N 19/46
(Continued)

(56) References Cited

U.S. PATENT DOCUMENTS

2019/0238883 A1* 8/2019 Chen ................. H04N 19/44
2020/0007888 A1* 1/2020 Xu ..................... H04N 19/52
(Continued)

FOREIGN PATENT DOCUMENTS

KR 10-2005-0122496 A 12/2005
KR 10-0708091 B1 4/2007
(Continued)

*Primary Examiner* — Albert Kir
(74) *Attorney, Agent, or Firm* — Dentons US LLP

(57) ABSTRACT

The picture decoding method by a decoding device, according to one embodiment of the present invention, comprises the steps of: deriving a motion vector for a neighboring merge candidate block from among neighboring merge candidate blocks of a current block, if a merge mode is applied to the current block, deriving a reference block in a reference picture indicated by the motion vector for the neighboring merge candidate block, deriving a refinement block having the minimal SAD with the current block, from among refinement candidate blocks within the search range of the reference block, if DMVR is applied to the current block, deriving prediction samples for the current block on the basis of a refinement motion vector for the derived refinement block, and generating restoration samples for the current block on the basis of the prediction samples.

9 Claims, 17 Drawing Sheets

(51) Int. Cl.
*H04N 19/137* (2014.01)
*H04N 19/44* (2014.01)
*H04N 19/132* (2014.01)
*H04N 19/46* (2014.01)

(52) U.S. Cl.
CPC ......... *H04N 19/137* (2014.11); *H04N 19/176* (2014.11); *H04N 19/46* (2014.11)

(58) Field of Classification Search
USPC ................................................ 375/240.25
See application file for complete search history.

(56) References Cited

U.S. PATENT DOCUMENTS

| | | | |
|---|---|---|---|
| 2020/0228815 A1* | 7/2020 | Xu | H04N 19/577 |
| 2020/0382807 A1* | 12/2020 | Liu | H04N 19/44 |
| 2021/0160527 A1* | 5/2021 | Chuang | H04N 19/55 |
| 2021/0274205 A1* | 9/2021 | Park | H04N 19/44 |

FOREIGN PATENT DOCUMENTS

| | | | | |
|---|---|---|---|---|
| KR | 10-2009-0079894 A | 7/2009 | | |
| KR | 10-2018-0059443 A | 6/2018 | | |
| KR | 10-2018-0061060 A | 6/2018 | | |
| WO | WO-2019009498 A1 * | 1/2019 | ............ | H04N 19/10 |
| WO | WO-2019212223 A1 * | 11/2019 | | |

\* cited by examiner

FIG. 10B

| Left | Above | TMVP | Combined | Zero |

DECODING APPARATUS

METHOD AND DEVICE FOR INTER PREDICTING ON BASIS OF DMVR

CROSS-REFERENCE TO RELATED APPLICATIONS

This application is the National Stage filing under 35 U.S.C. 371 of International Application No. PCT/KR2019/008691, filed on Jul. 15, 2019, which claims the benefit of U.S. Provisional Application No. 62/698,894 filed on Jul. 16, 2018, the contents of which are all hereby incorporated by reference herein in their entirety.

BACKGROUND OF THE DISCLOSURE

Field of the Disclosure

The present disclosure relates to a still image or a video encoding/decoding method, and more specifically, to a method and an apparatus for performing the inter-prediction based on a decoder-side motion vector refinement (DMVR).

Related Art

Demand for high-resolution, high-quality images such as High Definition (HD) images and Ultra High Definition (UHD) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide a method and an apparatus for performing the inter-prediction.

Still another object of the present disclosure is to provide a method and an apparatus for performing the inter-prediction based on a merge mode.

Yet another object of the present disclosure is to provide a method and an apparatus for performing the inter-prediction based on a DMVR, if a merge mode is applied to a current block.

Still yet another object of the present disclosure is to provide a method and an apparatus for determining whether a DMVR is to be applied to a current block based on a DMVR flag.

A further object of the present disclosure is to provide a method and an apparatus for deriving a neighbor merge candidate block based on a DMVR index indicating one of DMVR merge candidate blocks included in a DMVR merge candidate list, if a DMVR is applied to a current block.

According to an exemplary embodiment of the present disclosure, an image decoding method performed by a decoding apparatus is provided. The method includes: deriving a motion vector for one neighbor merge candidate block among neighbor merge candidate blocks of a current block, if a merge mode is applied to the current block, deriving a reference block indicated by the motion vector for the neighbor merge candidate block, in a reference picture, deriving a refinement block in which a sum of absolute differences (SAD) with the current block is the minimum among refinement candidate blocks within a search range of the reference block, if a decoder-side motion vector refinement (DMVR) is applied to the current block, deriving prediction samples for the current block based on a refinement motion vector for the derived refinement block, and generating reconstructed samples for the current block based on the prediction samples.

According to another exemplary embodiment of the present disclosure, a decoding apparatus for performing image decoding is provided. The decoding apparatus includes: a predictor configured to derive a motion vector for one neighbor merge candidate block among neighbor merge candidate blocks of a current block, if a merge mode is applied to the current block, derive a reference block indicated by the motion vector for the neighbor merge candidate block, in a reference picture, derive a refinement block in which the SAD with the current block is the minimum among refinement candidate blocks within a search range of the reference block if a DMVR is applied to the current block, and derive prediction samples for the current block based on a refinement motion vector for the derived refinement block and an adder configured to generate reconstructed samples for the current block based on the prediction samples.

According to still another exemplary embodiment of the present disclosure, an image encoding method performed by an encoding apparatus is provided. The method includes: deriving a motion vector for one neighbor merge candidate block among neighbor merge candidate blocks of the current block, if a merge mode is applied to the current block, deriving a reference block indicated by the motion vector for the neighbor merge candidate block, in a reference picture, deriving a refinement block in which the SAD with the current block is the minimum among refinement candidate blocks within a search range of the reference block, if a DMVR is applied to the current block, and encoding image information obtained in the process of deriving the refinement block.

According to yet another exemplary embodiment of the present disclosure, an encoding apparatus for performing image encoding. The encoding apparatus includes: a predictor configured to derive a motion vector for one neighbor merge candidate block among neighbor merge candidate blocks of a current block, if a merge mode is applied to the current block, derive a reference block indicated by the motion vector for the neighbor merge candidate block, in a reference picture, and derive a refinement block in which the SAD with the current block is the minimum among refinement candidate blocks within a search range of the reference block, if a DMVR is applied to the current block and an entropy encoder configured to encode image information obtained in the process of deriving the refinement block.

The present disclosure may enhance the overall image/video compression efficiency.

The present disclosure may efficiently perform the inter-prediction.

The present disclosure may efficiently perform the inter-prediction based on the merge mode.

The present disclosure may enhance the accuracy of the inter-prediction based on the DMVR, if the merge mode is applied to the current block.

The present disclosure may efficiently determine whether the DMVR is to be applied to the current block based on the DMVR flag.

The present disclosure may derive the neighbor merge candidate block based on the DMVR index indicating one of the DMVR merge candidate blocks included in the DMVR merge candidate list, if the DMVR is applied to the current block.

BRIEF DESCRIPTION OF THE DRAWINGS

FIGS. 10A and 10B are diagrams for explaining a method for configuring the DMVR merge candidate list in the case where the DMVR is applied to the current block according to an exemplary embodiment.

DESCRIPTION OF EXEMPLARY EMBODIMENTS

Figure 1:
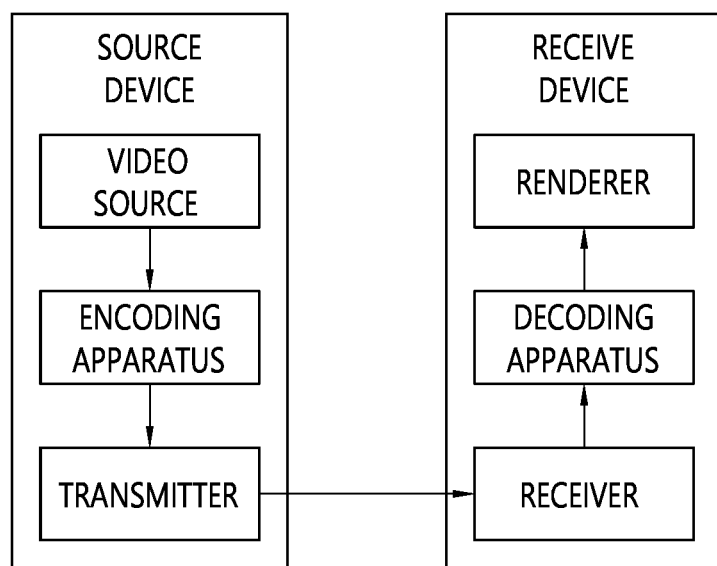
FIG. 1 schematically illustrates an example of a video/image coding system to which the present disclosure is applicable.

According to an exemplary embodiment of the present disclosure, an image decoding method performed by a decoding apparatus is provided. The method includes: deriving a motion vector for one neighbor merge candidate block among neighbor merge candidate blocks of a current block, if a merge mode is applied to the current block, deriving a reference block indicated by the motion vector for the neighbor merge candidate block, in a reference picture, deriving a refinement block in which a sum of absolute differences (SAD) with the current block is the minimum among refinement candidate blocks within a search range of the reference block, if a decoder-side motion vector refinement (DMVR) is applied to the current block, deriving prediction samples for the current block based on a refinement motion vector for the derived refinement block, and generating reconstructed samples for the current block based on the prediction samples.

This disclosure can be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

The following description relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Hereinafter, exemplary embodiments of this disclosure will be described in detail with reference to the accompanying drawings. Hereinafter, the same reference numerals are used for the same components in the drawings, and redundant description of the same components is omitted.

In the present specification, a video may mean a group of a series of images with the time. A picture generally means a unit of representing one image at a specific time zone, and a slice/tile means a unit of configuring a part of the picture in the coding. The slice/tile may include one or more coding tree units (CTUs). One picture may be composed of one or more slices/tiles. One picture may be composed of one or more tile groups, and one tile group may include one or more tiles. As necessary, the picture, the slice, and the tile may be interchangeably used.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma blocks. The unit may be used interchangeably with terms such as block or area in some cases. In a general case, an M×N block may include samples or a set of transform coefficients of M columns and N rows.

FIG. 1 is schematically illustrating a vide/image coding system to which this disclosure may be applied.

Referring to FIG. 1, a video/image coding system may include a source device and a receiving device. The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
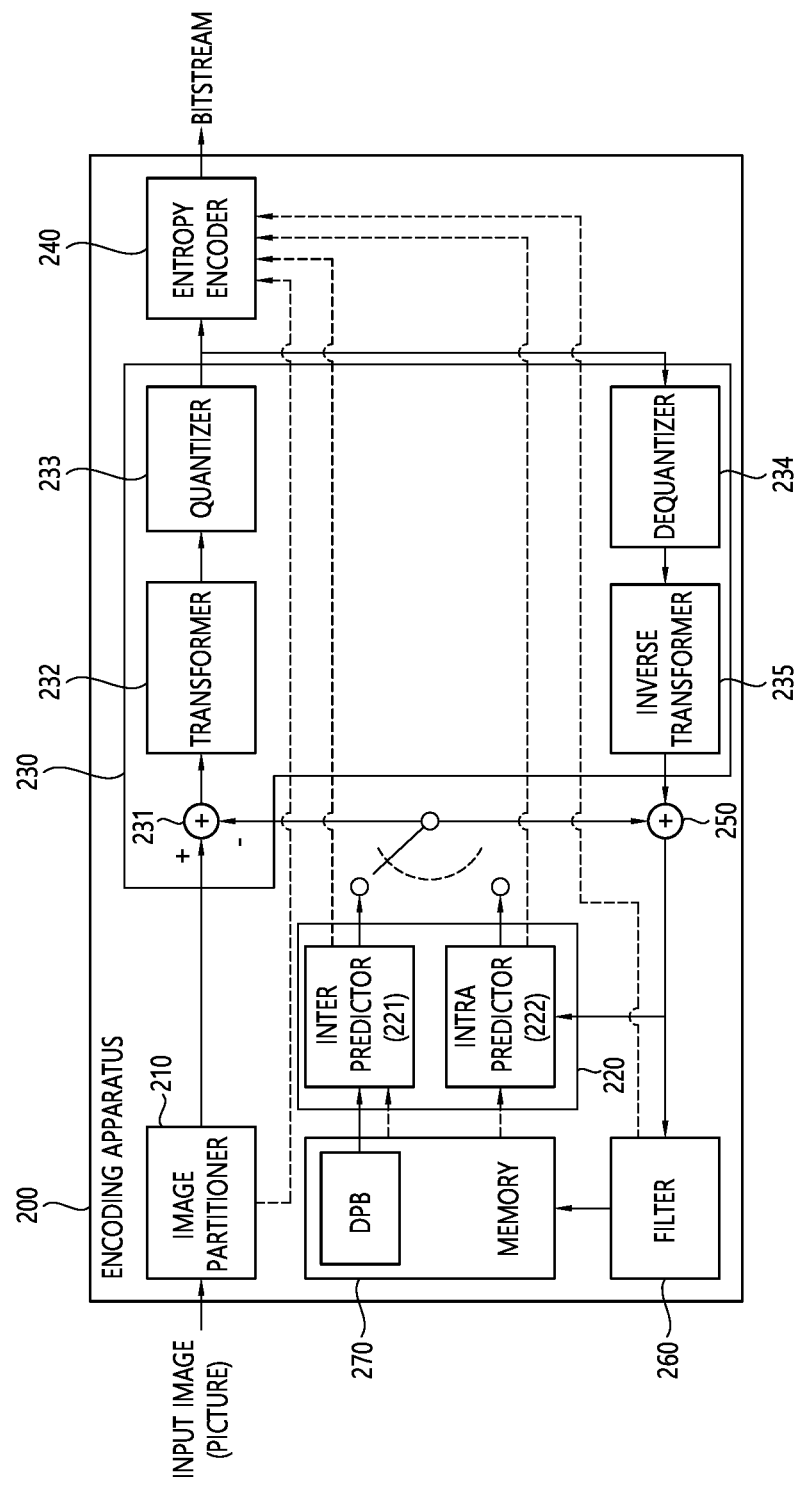
FIG. 2 is a diagram for schematically explaining a configuration of a video/image encoding apparatus to which the present disclosure is applicable.

FIG. 2 is a diagram for schematically explaining a configuration of a video/image encoding apparatus to which the present disclosure is applicable. Hereinafter, a video/image encoding apparatus may be referred to as an encoding apparatus, and a video/image decoding apparatus may be referred to as a decoding apparatus. The encoding/decoding apparatus may include a video encoding/decoding apparatus and/or an image encoding/decoding apparatus, and the video encoding/decoding apparatus may be used as a concept of including the image encoding/decoding apparatus, or the image encoding/decoding apparatus may also be used as a concept of including the video encoding/decoding apparatus.

Referring to FIG. 2, an encoding apparatus 200 may be configured to include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be referred to as a reconstructor or a reconstructed block generator. The image partitioner 210, the predictor 220, the residual processor 230, the entropy encoder 240, the adder 250, and the filter 260 may be configured by one or more hardware components (e.g., encoder chipsets or processors) according to an exemplary embodiment. Further, the memory 270 may include a decoded picture buffer (DPB), and may also be configured by a digital storage medium. The hardware component may further include the memory 270 as an internal/external component.

The image partitioner 210 may split input images (or, pictures or frames) input to the encoding apparatus 100 into one or more processing units. As an example, the processing unit may be referred to as a coding unit (CU). In this case, the coding unit may be recursively split according to a quad-tree binary-tree ternary-tree (QTBTTT) structure from a coding tree unit (CTU) or a largest coding unit (LCU). For example, one coding unit may be split into a plurality of coding units of a deeper depth based on a quad-tree structure, a binary-tree structure, and/or a ternary-tree structure. In this case, for example, the quad-tree structure may be first applied and the binary-tree structure and/or the ternary-tree structure may be applied later. Alternatively, the binary-tree structure may also be first applied. A coding procedure according to the present disclosure may be performed based on the final coding unit which is not split any more. In this case, based on the coding efficiency or the like according to the image characteristics, the largest coding unit may be directly used as the final coding unit, or as necessary, the coding unit may be recursively split into the coding units of the much deeper depth and the coding unit having the optimum size may be used as the final coding unit. Here, the coding procedure may include procedures such as prediction, transform, and reconstruction to be described. As another example, the processing unit may further include a prediction unit (PU) or a transform unit (TU). In this case, the prediction unit and the transform unit may be split or partitioned from the aforementioned final coding unit, respectively. The prediction unit may be a unit of the sample prediction, and the transform unit may be a unit of inducing a transform coefficient or a unit of inducing a residual signal from the transform coefficient.

The unit may be interchangeably used with the term such as a block or an area in some cases. Generally, an M×N block may represent a group of samples composed of M columns and N rows or the transform coefficients. The sample may generally represent a pixel or a value of the pixel, also represent only the pixel/pixel value of a luma component, and also represent the pixel/pixel value of a chroma component. The sample may use one picture (or image) as the term corresponding to a pixel or a pel.

The subtractor 231 may generate a residual signal (a residual block, residual samples, or a residual sample array) by subtracting a prediction signal (predicted block, prediction samples, or a prediction sample array) output from the predictor 220 from an input image signal (an original block, original samples, or an original sample array), and the generated residual signal is transmitted to the transformer 232. The predictor 220 may perform the prediction for the block to be processed (hereinafter, referred to as a current block), and generate a predicted block including the prediction samples for the current block. The predictor 220 may determine whether the intra-prediction is applied or the inter-prediction is applied to a current block or in units of the CU. The predictor may generate various information about the prediction, such as prediction mode information, to deliver the various information to the entropy encoder 240, as described later in the description of each prediction mode. The information about the prediction may be encoded by the entropy encoder 240 to be output in the form of a bitstream.

The intra-predictor 222 may predict a current block with reference to samples within a current picture. The referred samples may be located adjacent to the current block according to a prediction mode, or may also be located away from the current block. The prediction modes in the intra-prediction may include a plurality of non-directionality modes and a plurality of directionality modes. The non-directionality mode may include, for example, a DC mode or a planar mode. The directionality mode may include, for example, 33 directionality prediction modes or 65 directionality prediction modes according to the precision of the prediction direction. However, this is illustrative and a larger number or a fewer number of directionality prediction modes may be used according to the setting. The intra-predictor 222 may also determine the prediction mode applied to the current block using the prediction mode applied to a neighbor block.

The inter-predictor 221 may induce the predicted block for the current block based on a reference block (reference sample array) specified by a motion vector on a reference picture. At this time, motion information may be predicted in units of block, sub block, or sample based on the correlation of the motion information between the neighbor block and the current block in order to reduce an amount of the transmitted motion information in the inter-prediction mode. The motion information may include a motion vector and a reference picture index. The motion information may further include inter-prediction direction (L0 prediction, L1 prediction, Bi prediction, or the like) information. In the case of the inter-prediction, the neighbor block may include a spatial neighbor block existing within the current picture and a temporal neighbor block existing within the reference picture. A reference picture including the reference block and a reference picture including the temporal neighbor block may be the same as each other, and also be different from each other. The temporal neighbor block may be referred to as a collocated reference block, a collocated CU (colCU), or the like, and the reference picture including the temporal neighbor block may also be referred to as a collocated picture (colPic). For example, the inter-predictor 221 may configure a motion information candidate list based on neighbor blocks, and generate information indicating which candidate is used in order to derive the motion vector and/or the reference picture index of the current block. The inter-prediction may be performed based on various prediction modes, and for example, in the case of a skip mode and a merge mode, the inter-predictor 221 may use the motion information of the neighbor block as the motion information of the current block. In the case of the skip mode, the residual signal may not be transmitted unlike the merge mode. The motion information prediction (MVP) mode may use the motion vector of the neighbor block as a motion vector predictor, and indicate the motion vector of the current block by signaling a motion vector difference.

The predictor 220 may generate a prediction signal based on various prediction methods to be described later. For example, the predictor may not only apply the intra-prediction or the inter-prediction for the prediction for one block, but also apply the intra-prediction and the inter-prediction at the same time. This may be referred to as a combined inter and intra prediction (CIIP). Further, the predictor may also perform an intra block copy (IBC) for the prediction for the block. The intra block copy may be, for example, used for the content image/video coding of a game such as a screen content coding (SCC). The IBC basically performs the prediction within the current picture but may be performed similar to the inter-prediction in that the reference block is derived within the current picture. That is, the IBC may use at least one of the inter-prediction techniques described in the present document.

The prediction signal generated by the inter-predictor 221 and/or the intra-predictor 222 may be used to generate a reconstructed signal or used to generate a residual signal. The transformer 232 may generate transform coefficients by applying the transform technique to the residual signal. For example, the transform technique may include a discrete cosine transform (DCT), a discrete sine transform (DST), a graph-based transform (GBT), a conditionally non-linear transform (CNT), or the like. Here, the GBT means the transform obtained by a graph when the relationship information between the pixels is expressed by the graph. The CNT means the transform obtained based on the prediction signal generated using all previously reconstructed pixels. Further, the transform process may be applied to the square pixel block having the same size, and may also be applied to the non-square block having a variable size.

The quantizer 233 may quantize the transform coefficients to transmit the quantized transform coefficients to the entropy encoder 240, and the entropy encoder 240 may encode a quantized signal (information about the quantized transform coefficients) to output the quantized signal as a bitstream. The information about the quantized transform coefficients may be referred to as residual information. The quantizer 233 may realign the quantized transform coefficients having the block form in the form of a one-dimensional vector based on a coefficient scan order, and also generate the information about the quantized transform coefficients based on the quantized transform coefficients having the form of the one-dimensional vector. The entropy encoder 240 may perform various encoding methods, for example, such as an exponential Golomb, a context-adaptive variable length coding (CAVLC), and a context-adaptive binary arithmetic coding (CABAC). The entropy encoder 240 may also encode information (e.g., values of syntax elements and the like) necessary for reconstructing videos/images other than the quantized transform coefficients together or separately. The encoded information (e.g., encoded video/image information) may be transmitted or stored in units of network abstraction layer in the form of the bitstream. The video/image information may further include information about various parameter sets such as an adaptation parameter set (APS), a picture parameter set (PPS), a sequence parameter set (SPS), or a video parameter set (VPS). Further, the video/image information may further include general constraint information. The information signaled and transmitted and/or the syntax elements, which will be described later in the present document, may be encoded through the aforementioned encoding procedure and included in the bitstream. The bitstream may be transmitted through a network, or stored in a digital storage medium. Here, the network may include a broadcast network and/or a communication network, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the same may be configured as the internal/external element of the encoding apparatus 200, or a transmitter may also be included in the entropy encoder 240.

The quantized transform coefficients output by the quantizer 233 may be used to generate the prediction signal. For example, the residual signal (residual block or residual samples) may be reconstructed by applying the dequantization and the inverse transform to the quantized transform coefficients through the dequantizer 234 and the inverse transformer 235. The adder 250 may add the reconstructed residual signal to the prediction signal output by the predictor 220 to generate a reconstructed signal (a reconstructed picture, a reconstructed block, reconstructed samples, or a reconstructed sample array). As in the case whether the skip mode is applied, if there is no residual for the block to be processed, the predicted block may be used as the reconstructed block. The generated reconstructed signal may be used for the intra-prediction of a next block to be processed within the current picture, and as described later, may also be used for the inter-prediction of a next picture through the filtering.

Meanwhile, a luma mapping with chroma scaling (LMCS) may also be applied in the picture encoding and/or reconstruction process.

The filter 260 may apply the filtering to the reconstructed signal to improve the subjective/objective quality. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset (SAO), an adaptive loop filter, a bilateral filter, or the like. The filter 260 may generate various information about the filtering as descried later in the description of each filtering method to deliver the various information to the entropy encoder 240. The information about the filtering may be encoded by the entropy encoder 240 to be output in the form of the bitstream.

The modified reconstructed picture transmitted to the memory 270 may be used as the reference picture in the inter-predictor 280. Therefore, if the inter-prediction is applied, the encoding apparatus may avoid the prediction mismatch between the encoding apparatus 200 and the decoding apparatus, and also improve the coding efficiency.

The DPB of the memory 270 may store the modified reconstructed picture to be used as the reference picture in the inter-predictor 221. The memory 270 may store the motion information of the block in which the motion information within the current picture is derived (or encoded) and/or the motion information of the blocks within the previously reconstructed picture. The stored motion information may be delivered to the inter-predictor 221 to be used as the motion information of the spatial neighbor block or the motion information of the temporal neighbor block. The memory 270 may store the reconstructed samples of the reconstructed blocks within the current picture, and deliver the reconstructed samples to the intra-predictor 222.

Figure 3:
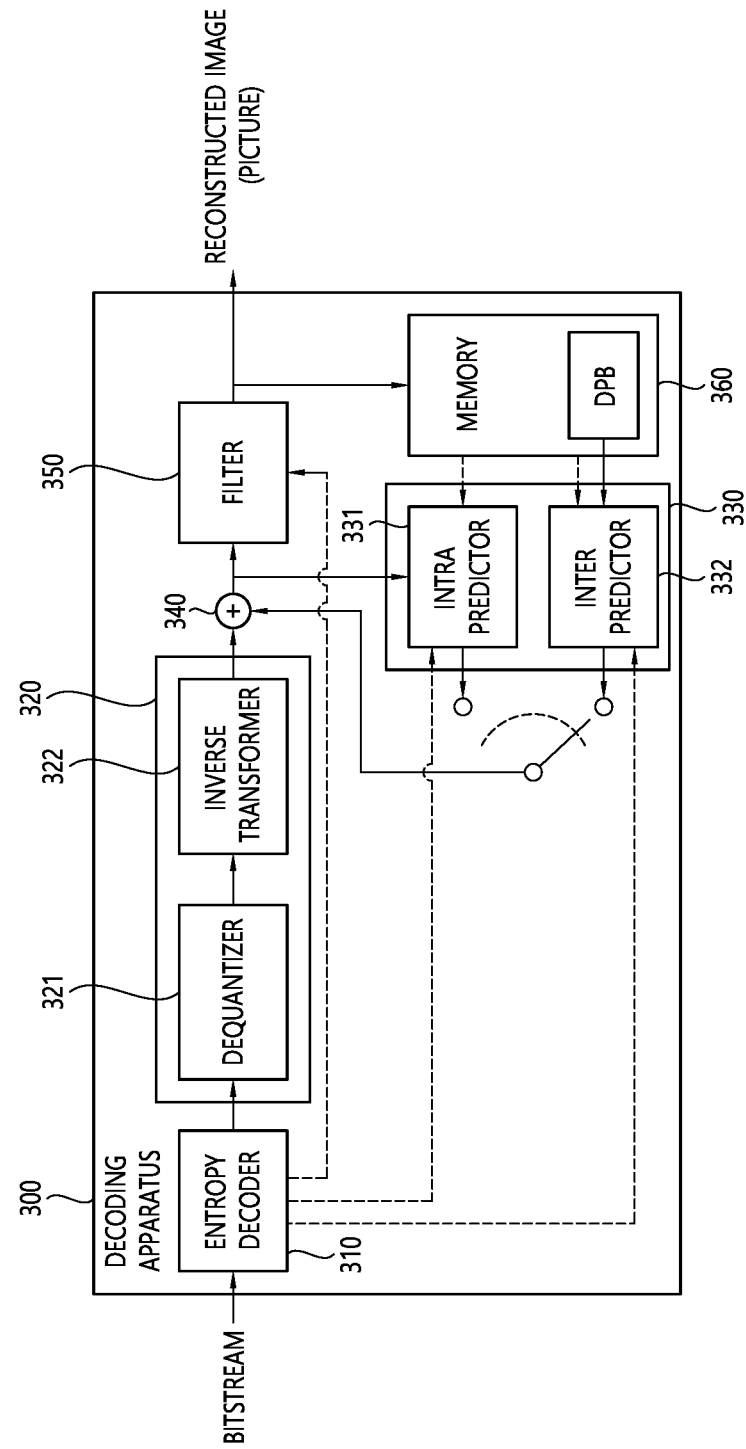
FIG. 3 is a diagram for schematically explaining a configuration of a video/image decoding apparatus to which the present disclosure is applicable.

FIG. 3 is a diagram for schematically explaining a configuration of a video/image decoding apparatus to which the present disclosure is applicable.

Referring to FIG. 3, a decoding apparatus 300 may be configured to include an entropy decoder 310, a residual processor 320, a predictor 330, an adder 340, a filter 350, and a memory 360. The predictor 330 may include an inter-predictor 331 and an intra-predictor 332. The residual processor 320 may include a dequantizer 321 and an inverse transformer 322. The entropy decoder 310, the residual processor 320, the predictor 330, the adder 340, and the filter 350 may be configured by one hardware component (e.g., a decoder chipset or a processor) according to an exemplary embodiment. Further, the memory 360 may include a decoded picture buffer (DPB), and may also be configured by a digital storage medium. The hardware component may further include the memory 360 as the internal/external component.

When a bitstream including video/image information is input, the decoding apparatus 300 may reconstruct an image in correspondence with a process in which the video/image information is processed in the encoding apparatus illustrated in FIG. 2. For example, the decoding apparatus 300 may derive units/blocks based on block split-related information obtained from the bitstream. The decoding apparatus 300 may perform the decoding using a processing unit applied to the encoding apparatus. Therefore, the processing unit of the decoding may be, for example, the coding unit, and the coding unit may be split according to a quad-tree structure, a binary-tree structure, and/or a ternary-tree structure from the coding tree unit or the largest coding unit. One or more transform units may be derived from the coding unit. Further, the reconstructed image signal decoded and output by the decoding apparatus 300 may be reproduced by a reproduction apparatus.

The decoding apparatus 300 may receive the signal output by the encoding apparatus illustrated in FIG. 2 in the form of the bitstream, and the received signal may be decoded by the entropy decoder 310. For example, the entropy decoder 310 may derive information (e.g., video/image information) necessary for the image reconstruction (or picture reconstruction) by parsing the bitstream. The video/image information may further include the information about various parameter sets such as an adaptation parameter set (APS), a picture parameter set (PPS), a sequence parameter set (SPS), or a video parameter set (VPS). Further, the video/image information may further include general constraint information. The decoding apparatus may decode the picture further based on the information about the parameter set and/or the general constraint information. The information signaled/received and/or the syntax elements, which will be described later in the present document, may be decoded through the aforementioned decoding procedure and obtained from the bitstream. For example, the entropy decoder 310 may decode information within the bitstream based on a coding method such as an exponential Golomb coding, a CAVLC, or a CABAC, and output a value of the syntax element necessary for the image reconstruction, and quantized values of the transform coefficient about the residual. More specifically, the CABAC entropy decoding method may receive a bin corresponding to each syntax element in the bitstream, determine a context model using decoding target syntax element information, decoding information of the neighbor and decoding target blocks, or information of the symbol/bin decoded in the prior stage, and generate a symbol corresponding to a value of each syntax element by predicting the generation probability of the bin according to the determined context model to perform the arithmetic decoding of the bin. At this time, the CABAC entropy decoding method may update the context model using the information of the symbol/bin decoded for a context model of a next symbol/bin after determining the context model. Information about the prediction of the information decoded by the entropy decoder 310 may be provided to the predictor 330, and information about the residual in which the entropy decoding is performed by the entropy decoder 310, that is, the quantized transform coefficients and the related parameter information may be input to the dequantizer 321. Further, information about the filtering of the information decoded by the entropy decoder 310 may be provided to the filter 350. Meanwhile, a receiver (not illustrated) receiving the signal output by the encoding apparatus may be further configured as the internal/external element of the decoding apparatus 300, or the receiver may also be the component of the entropy decoder 310. Meanwhile, the decoding apparatus according to the present document may be referred to as a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may realign the quantized transform coefficients in the form of the two-dimensional block. In this case, the realignment may be performed based on the coefficient scan order performed by the encoding apparatus. The dequantizer 321 may perform the dequantization for the quantized transform coefficients using the quantization parameter (e.g., quantization step size information), and obtain the transform coefficients.

The inverse transformer 322 inversely transforms the transform coefficients to obtain a residual signal (a residual block, a residual sample array).

The predictor may perform the prediction for a current block, and generate a predicted block including prediction samples for the current block. The predictor may determine whether the intra-prediction is applied to the current block or the inter-prediction is applied to the current block based on the information about the prediction output by the entropy decoder 310, and determine a specific intra/inter prediction mode.

The predictor may generate a prediction signal based on various prediction methods to be described later. For example, the predictor may apply the intra-prediction or the inter-prediction for the prediction for one block, and simultaneously apply the intra-prediction and the inter-prediction. This may be referred to as a combined inter and intra prediction (CIIP). Further, the predictor may also perform an intra block copy (IBC) for the prediction for the block. The intra block copy may be, for example, used for the content image/video coding of a game such as a screen content coding (SSC). The IBC may basically perform the prediction within the current picture but may be performed similar to the inter-prediction in that a reference block is derived within the current picture. That is, the IBC may use at least one of inter-prediction techniques described in the present document.

The inter-predictor 332 may predict the current block with reference to the samples within the current picture. The referred samples may be located neighbor to the current block according to the prediction mode, or may also be located away from the current block. The prediction modes in the intra-prediction may include a plurality of non-directionality modes and a plurality of directionality modes. The intra-predictor 332 may also determine the prediction mode applied to the current block using the prediction mode applied to the neighbor block.

The inter-predictor 331 may induce a predicted block for the current block based on a reference block (reference sample array) specified by a motion vector on the reference picture. At this time, motion information may be predicted in units of block, sub block, or sample based on the correlation of the motion information between the neighbor block and the current block in order to reduce an amount of the transmitted motion information in the inter-prediction mode. The motion information may include a motion vector and a reference picture index. The motion information may further include an inter-prediction direction (L0 prediction, L1 prediction, Bi prediction, or the like) information. In the case of the inter-prediction, the neighbor block may include a spatial neighbor block existing within the current picture and a temporal neighbor block existing within the reference picture. For example, the inter-predictor 331 may configure a motion information candidate list based on the neighbor blocks, and derive the motion vector and/or the reference picture index of the current block based on the received candidate selection information. The inter-prediction may be performed based on various prediction modes, and the information about the prediction may include information indicating the mode of the inter-prediction for the current block.

The adder 340 may generate a reconstructed signal (a reconstructed picture, a reconstructed block, a reconstructed sample array) by adding the obtained residual signal to the prediction signal (a predicted block, a prediction sample array) output by the predictor 330. As in the case where a skip mode is applied, if there is no residual for the block to be processed, the predicted block may be used as the reconstructed block.

The adder 340 may be referred to as a reconstructor or a reconstructed block generator. The generated reconstructed signal may be used for the intra-prediction of a next block to be processed within the current picture, and as descried later, may be output through the filtering or may also be used for the inter-prediction of a next picture.

Meanwhile, a luma mapping with chroma scaling (LMCS) may also be applied in the picture decoding process.

The filter 350 may apply the filtering to the reconstructed signal to improve the subjective/objective quality. For example, the filter 350 may apply various filtering methods to the reconstructed picture to generate a modified reconstructed picture, and transmit the modified reconstructed picture in the memory 360, specifically, the DPB of the memory 360. Various filtering methods may include, for example, a deblocking filtering, a sample adaptive offset (SAO), an adaptive loop filter, a bilateral filter, or the like.

The (modified) reconstructed picture stored in the DPB of the memory 360 may be used as the reference picture in the inter-predictor 331. The memory 360 may store the motion information of the block in which the motion information within the current picture is derived (or decoded) and/or the motion information of the blocks within the previously reconstructed picture. The stored motion information may be delivered to the inter-predictor 331 to be used as the motion information of the spatial neighbor block or the motion information of the temporal neighbor block. The memory 360 may store the reconstructed samples of the reconstructed blocks within the current picture, and deliver the reconstructed samples to the intra-predictor 332.

In the present specification, the exemplary embodiments described in the predictor 330, the dequantizer 321, the inverse transformer 322, the filter 350, and the like of the decoding apparatus 300 may be equally or correspondingly applied to the predictor 220, the dequantizer 234, the inverse transformer 235, the filter 260, and the like of the encoding apparatus 200, respectively.

As described above, the prediction is performed to enhance the compression efficiency in performing the video coding. Therefore, the predicted block including the prediction samples for the current block, which is the block to be coded, may be generated. Here, the predicted block includes the prediction samples in the spatial domain (or pixel domain). The predicted block may be equally derived by the encoding apparatus and the decoding apparatus, and the encoding apparatus may signal the information about the residual (residual information) between the original block and the predicted block rather than the original sample value itself of the original block to the decoding apparatus, thereby enhancing the image coding efficiency. The decoding apparatus may derive a residual block including residual samples based on the residual information, generate a reconstructed block including reconstructed samples by summing the residual block and the predicted block, and generate the reconstructed picture including the reconstructed blocks.

The residual information may be generated through the transform and quantization procedures. For example, the encoding apparatus may signal the related residual information (through the bitstream) to the decoding apparatus by deriving the residual block between the original block and the predicted block, deriving transform coefficients by performing the transform procedure for the residual samples (residual sample array) included in the residual block, and deriving the quantized transform coefficients by performing the quantization procedure for the transform coefficients. Here, the residual information may include value information of the quantized transform coefficients, location information, and information such as a transform technique, a transform kernel, and a quantization parameter. The decoding apparatus may perform the dequantization/inverse transform procedure based on the residual information and derive the residual samples (or residual block). The decoding apparatus may generate the reconstructed picture based on the predicted block and the residual block. Further, the encoding apparatus may derive the residual block by dequantizing/inversely transforming the quantized transform coefficients for the reference for the inter-prediction of next pictures, and generate the reconstructed picture based on the residual block.

Figure 4:
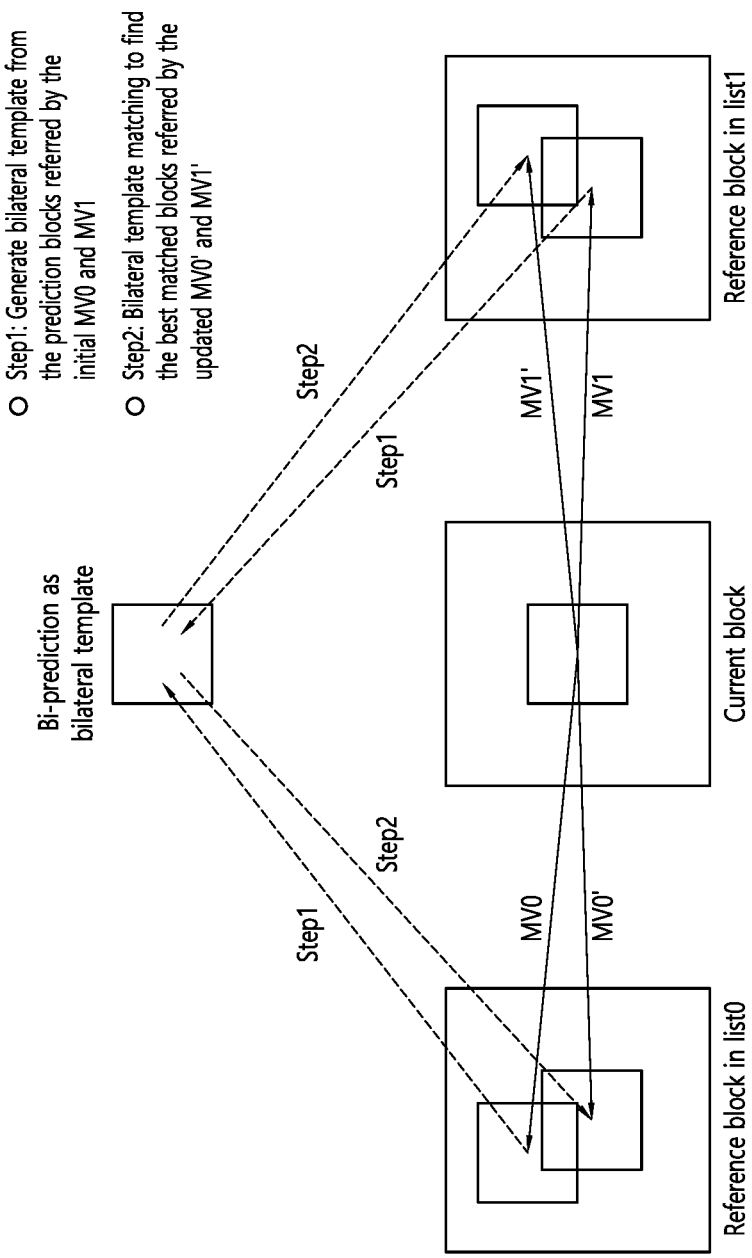
FIG. 4 is a diagram for explaining an example of a process of performing a DMVR in the bilateral prediction.

FIG. 4 is a diagram for explaining an example of a process of performing a DMVR in the bilateral prediction (or bi-directional prediction, bi-prediction).

The present specification uses specific terms or sentences for defining specific information or concepts. For example, a reference picture within a reference picture list L0 for the current picture is represented by "L0 reference picture", and the inter-prediction performed based on the reference pictures existing in different directions with respect to the current picture is represented by "positive direction prediction". However, the "L0 reference picture" may be replaced with various terms such as a first reference picture, a List 0 reference picture, a reference picture L0, and an L0 picture, and the "positive direction prediction" may be replaced with various terms such as bi-prediction and bi-directional prediction, such that when interpreting the specific terms or sentences used for defining the specific information or concepts in the present specification throughout the specification, the interpretation should not be made as being limited to the names, and the interpretation needs to be made by paying attention to various operations, functions, and effects according to the contents expressed by the terms.

Since the skip mode and/or the merge mode predicts the motion of the current block based on the motion vector of the neighbor block without a motion vector difference (MVD), they have the limitation to the motion prediction. To overcome the limitation of the skip mode and/or the merge mode, a decoder-side motion vector refinement refining the motion vector in the decoding apparatus may be applied. FIG. 4 schematically illustrates the DMVR process, in which the DMVR illustrated in FIG. 4 may be referred to as the DMVR based on the bilateral prediction or the DMVR based on the bilateral matching method. The DMVR process illustrated in FIG. 4 may be used when the bilateral prediction (or bi-prediction) is applied to the current block.

That is, if the derived motion information of the current block is the bi-prediction motion information, the DMVR based on the bilateral matching method may be applied. Here, the bi-prediction motion information may include L0 motion information (or first motion information) and L1 motion information (or second motion information). The L0 motion information may include an L0 reference picture index (or a first reference picture index) indicating the L0 reference picture (or a first reference picture) included in a reference picture list L0 (or a first reference picture list) for the current block and an L0 motion vector (also referred to as MVL0 or a first motion vector), and the L1 motion information may include an L1 reference picture index (or a second reference picture index) indicating the L1 reference picture (or a second reference picture) included in a reference picture list L1 (or a second reference picture list) for the current block and an L1 motion vector (also referred to as MVL1 or a second motion vector).

The motion information including only the L0 motion information or the L1 motion information may be referred to as uni-prediction motion information. In performing the prediction for the current block, the case where the inter-prediction is performed based on the L0 motion information may be referred to as the L0 prediction, the case where the inter-prediction is performed based on the L1 motion information may be referred to as the L1 prediction, and the case where the inter-prediction is performed based on the L0 motion information and the L1 motion information may be referred to as the bi-prediction.

Referring to FIG. 4, the encoding apparatus and/or the decoding apparatus may derive an L0 reference block (or a first reference block) indicated by the L0 motion information and an L1 reference block (or a second reference block) indicated by the L1 motion information, which are included in the motion information, and derive a target block based on the L0 reference block and the L1 reference block. For example, the encoding apparatus and/or the decoding apparatus may derive the target block by averaging the L0 reference block and the L1 reference block. That is, the decoding apparatus may configure the target block by deriving the average between the corresponding samples of the L0 reference block and the L1 reference block as the sample of the target block. The target block may also be referred to as a template.

Thereafter, the encoding apparatus and/or the decoding apparatus may derive the target block among the L0 reference blocks included in the neighbor area of the L0 reference block (or the first reference block) and a refine L0 reference block (or an L0 refine reference block, a first refine reference block, or the like) having the smallest SAD, and derive the target block of the L1 reference blocks included in the neighbor area of the L1 reference block and a refine L1 reference block (or an L1 refine reference block, a second refine reference block, or the like) having the smallest SAD. Refine L0 motion information (may also be referred to as a refine L0 motion vector, an L0 refine motion vector, an L0 refinement motion vector, or first refine motion information) indicating the refine L0 reference block and refine L1 motion information (may also be referred to as a refine L1 motion vector, an L1 refine motion vector, an L1 refinement motion vector, or second refine motion information) indicating the refine L1 reference block may be derived as the refine motion information. That is, the refine motion information may include the refine L0 motion information and the refine L1 motion information.

The neighbor area of the L0 reference block may be derived based on a search range for the L0 reference picture, and the neighbor area of the L1 reference block may be derived based on a search range for the L1 reference picture. As an example, the size of the search range for the L0 reference picture and the size of the search range for the L1 reference picture may be equal to each other as the 2-pixel size. In some cases, the search range for the L0 reference picture and the search range for the L1 reference picture indicate the same search ranges, and may be referred to as 'the search ranges for the L0 reference picture (or the first reference picture) and the L1 reference picture (or the second reference picture)'. Meanwhile, the 2-pixel size, which is the size of the search range, is merely illustrative, and the example of the size of the search range is not limited to the 2-pixel size.

The DMVR may be applied to the motion information (i.e., the selected motion information) of the current block, the merge candidate of the current block, or the MVP candidate. If the DMVR is applied to the merge candidate of the current block or the MVP candidate, a refine merge candidate or a refine MVP candidate including the refine motion information may be derived, and the derived refine merge candidate or refine MVP candidate may be added to the motion information candidate list (i.e., the merge candidate list or the MVP candidate list) of the current block.

Figure 5:
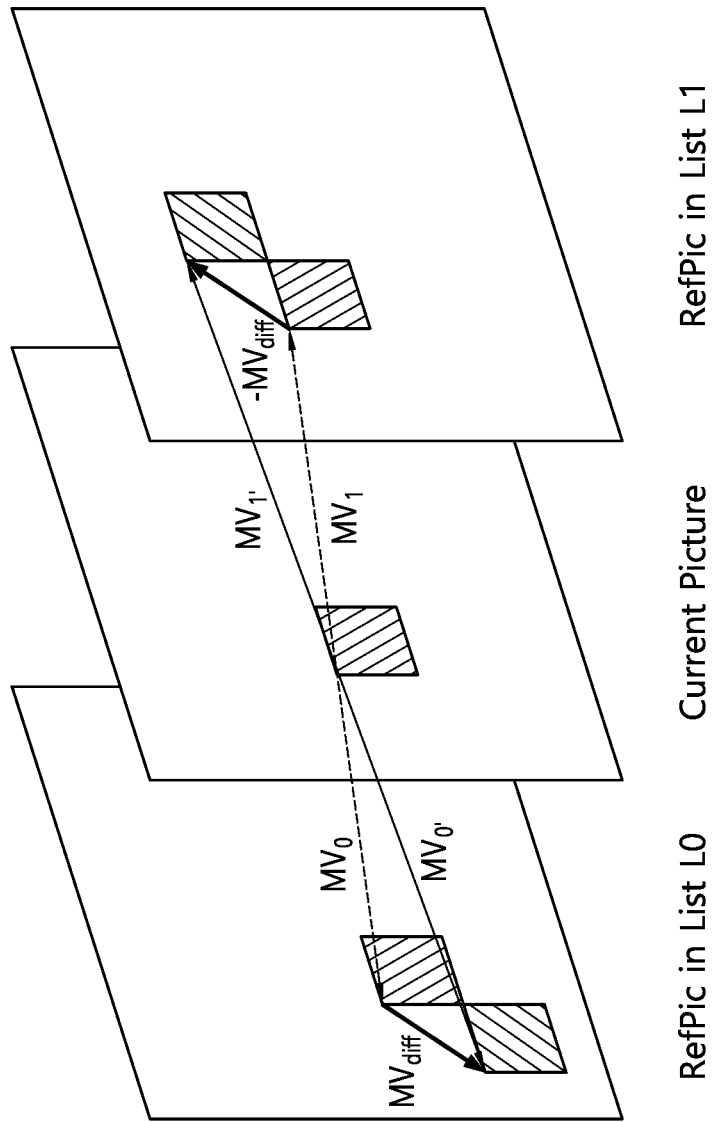
FIG. 5 is a diagram for explaining another example of the process of performing the DMVR in the bilateral prediction.

FIG. 5 is a diagram for explaining another example of a process of performing the DMVR in the bilateral prediction.

To improve the accuracy of the motion vector in the merge mode, the decoder side motion vector refinement based on the bilateral-matching may be applied. In the bilateral prediction, the refined motion vector may be searched around an initial motion vector indicating the L0 reference picture or the L1 reference picture.

In the bilateral prediction according to the exemplary embodiment, the refine L0 reference block may be derived from the L0 reference block, and the refine L1 reference block may be derived from the L1 reference block such that the SAD between the refine L0 reference block and the refine L1 reference block is smaller than the SAD between the L0 reference block and the L1 reference block.

A template-free DMVR according to another exemplary embodiment may first determine whether the SAD between the L0 reference block and the L1 reference block is smaller than a threshold in the integer sample search. If the SAD between the L0 reference block and the L1 reference block is smaller than the threshold, the integer sample search may be terminated, and if the SAD between the L0 reference block and the L1 reference block is larger than the threshold, a point having the minimum SAD may be derived by calculating and checking the SADs of other points in a specific order (e.g., raster scanning order). After the integer sample search, a decimal sample search may be performed based on a parametric error surface equation. The refine reference block may be derived based on the integer sample search and the decimal sample search.

Figure 6:
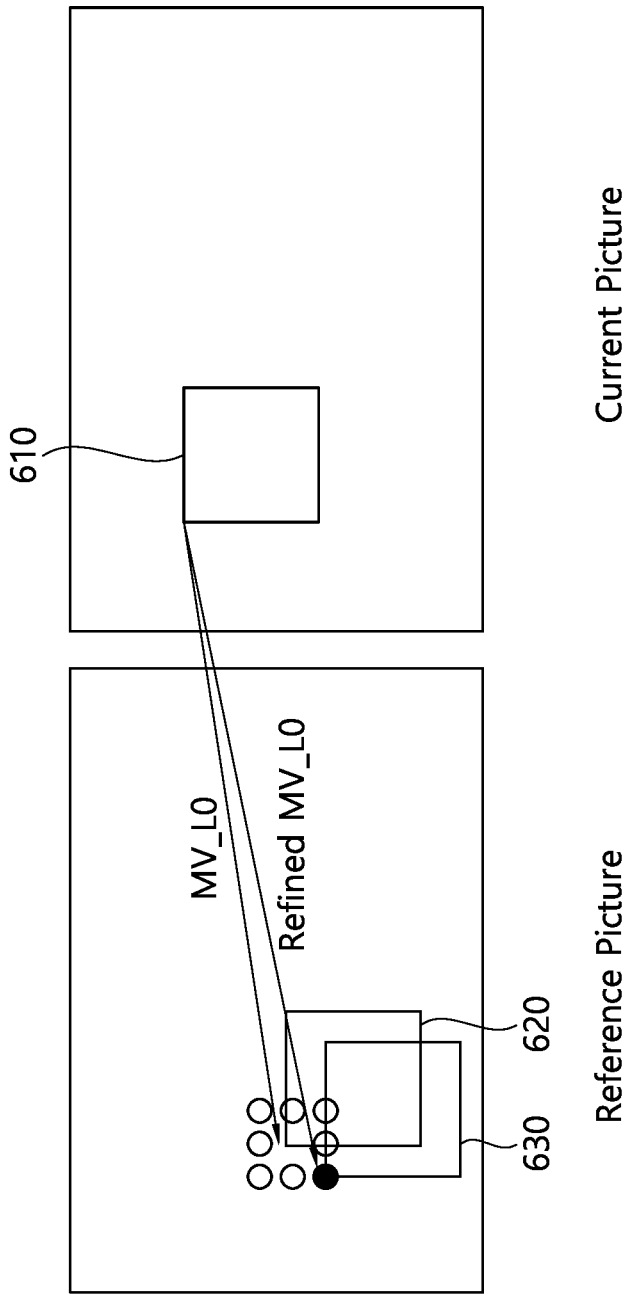
FIG. 6 is a diagram for explaining an example of a process of performing a DMVR in the uni-directional prediction.

FIG. 6 is a diagram for explaining an example of a process of performing the DMVR in the uni-direction prediction.

According to the exemplary embodiment, the DMVR may be applied to the case where the merge mode is applied to a current block 610, and the bilateral prediction is performed based on the True bi-prediction. At this time, the True bi-prediction means the case where the L0 reference picture and the L1 reference picture exist in the directions opposite to each other with respect to the current block 610. However, when the DMVR is applied to only the case whether the bilateral prediction is performed, the DMVR may not be applied in the low-delay environment, thereby reducing the coding performance or efficiency.

Therefore, the exemplary embodiment of the present disclosure is intended to apply the DMVR even to the case of performing the uni-direction prediction (or uni-direction) to improve the coding performance or efficiency.

Referring to FIG. 6, in the case of performing the DMVR upon the uni-direction prediction, an L0 predictor 620 indicated by the L0 motion vector may correspond to the best candidate for the current block 610 like the bilateral template illustrated in FIG. 4. Therefore, the motion vector for a block 630 having the minimum value of the sum of absolute difference (SAD) with the L0 predictor 620 may be determined as the L0 refinement motion vector. That is, the block in which the SAD with the reference block 620 is smallest among the blocks located within a pre-defined search range of the reference block 620 indicated by the motion vector of the current block 610 may be determined as the refinement reference block 630, and a final motion compensation may be performed based on the motion vector of the refinement reference block 630.

Meanwhile, FIG. 6 illustrates the DMVR application method for the uni-direction prediction based on the L0 motion vector, but the example is not limited thereto. For example, the DMVR method may also be applied to the uni-direction prediction based on the L1 motion vector.

Figure 7:
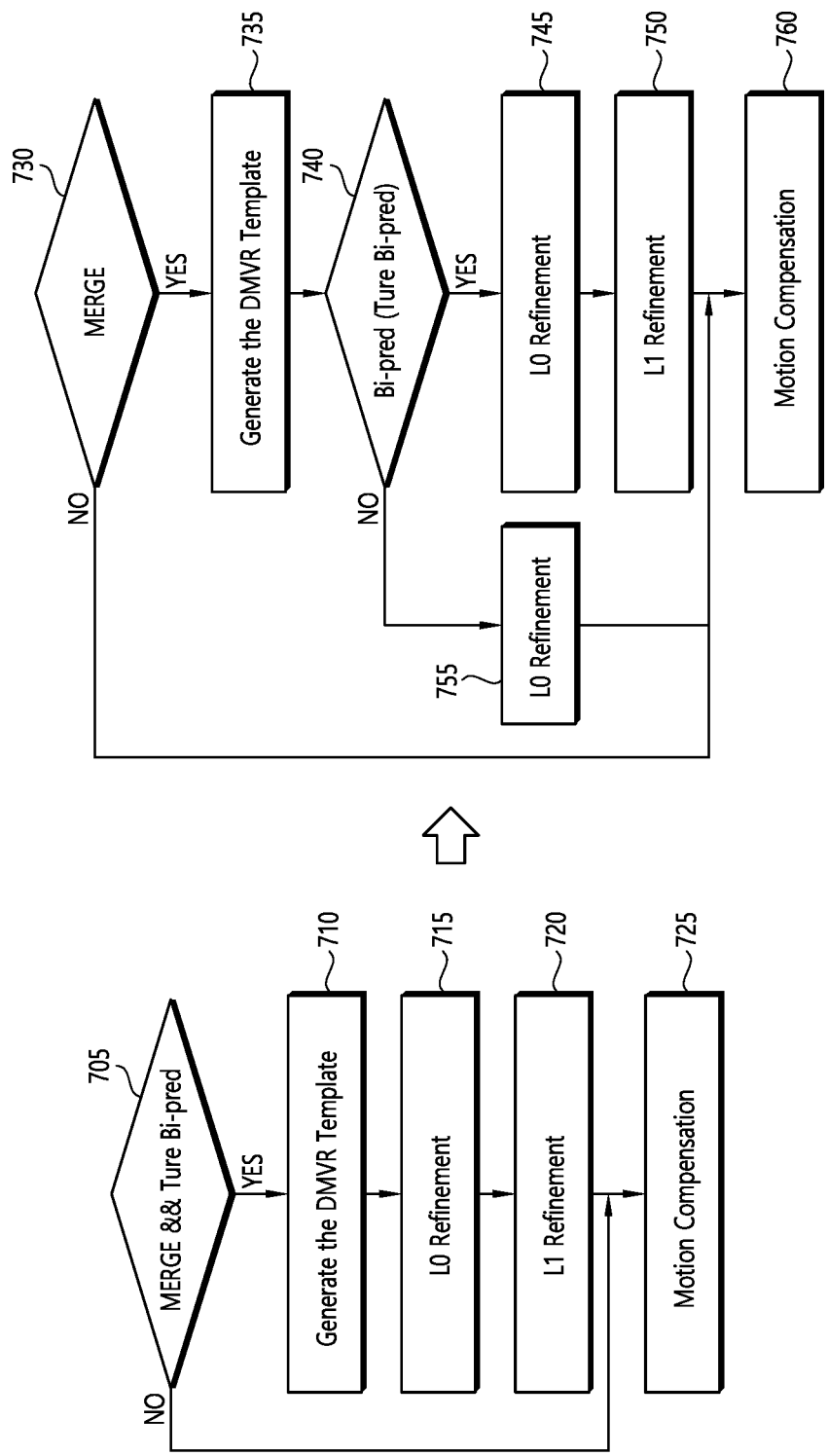
FIG. 7 is a flowchart illustrating an example of performing the refinement based on whether the bilateral prediction is to be applied to a current block.

FIG. 7 is a flowchart illustrating an example of performing the refinement based on whether the bilateral prediction is applied to the current block.

A left flowchart illustrates a process of applying the DMVR if the bilateral prediction is applied to the current block. A right flowchart illustrates a process of applying the DMVR to the bilateral prediction and the uni-direction prediction in different methods, based on the determination about whether the bilateral prediction is applied to the current block. According to the left flowchart, the DMVR may be applied to only the case where the bilateral prediction is applied to the current block, whereas according to the right flowchart, only a specific operation is different, and the DMVR may be applied regardless of whether the bilateral prediction is applied to the current block or the uni-direction prediction is applied to the current block.

Referring to the left flowchart, the decoding apparatus according to the exemplary embodiment may determine whether the merge mode is applied to the current block, and the True bi-prediction is applied to the current block (S705). If it is determined that the merge mode is applied to the current block, and the True bi-prediction is applied to the current block in the S705, the decoding apparatus may generate the DMVR template illustrated in FIG. 4 (S710). However, a process of generating the DMVR template in the S710 is not the essential operation, and for example, if the method illustrated in FIG. 5 is to be used, the process of generating the DMVR template may be omitted. The decoding apparatus may perform the L0 refinement for the L0 reference picture (S715), perform the L1 refinement of the L1 reference picture (S720), and perform the motion compensation (S725). If it is determined that the merge mode is not applied to the current block, or the True bi-prediction is not applied to the current block in the S705, the decoding apparatus may omit the S710, the S715, and the S720 (i.e., omit the DMVR) and directly perform the motion compensation (S725). Meanwhile, it will be easily understood to those skilled in the art that the operations according to the S705, the S710, the S715, the S720, and the S725 may be performed not only in the case of the True bi-prediction but also in the case of the generalized bi-prediction.

Referring to the right flowchart, the decoding apparatus according to another exemplary embodiment may determine whether the merge mode is applied to the current block (S730). If it is determined that the merge mode is applied to the current block in the S730, the decoding apparatus may generate the DMVR template illustrated in FIG. 4 (S735). However, the process of generating the DMVR template in the S735 is not the essential operation, and for example, if the method illustrated in FIG. 5 is to be used, the process of generating the DMVR template may be omitted. The decoding apparatus may determine whether the bilateral prediction is applied to the current block or the uni-direction prediction is applied to the current block (S740). If it is determined that the bilateral prediction is applied to the current block in the S740, the decoding apparatus may perform an L0 refinement 745 for the L0 reference picture and an L1 refinement 750 for the L1 reference picture. Conversely, if it is determined that the uni-direction prediction is applied to the current block in the S740, the decoding apparatus may perform only an L0 refinement 755 for the L0 picture. The decoding apparatus may perform the motion compensation based on the refinement performance result (S760).

Figure 8A:
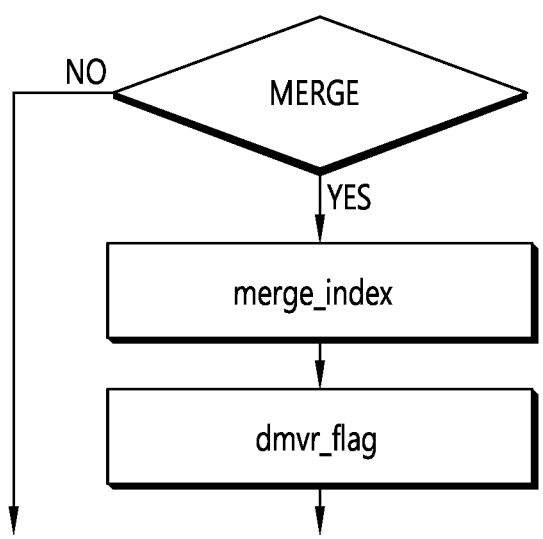
FIGS. 8A and 8B are flowcharts illustrating examples of a decoding process of determining whether the DMVR is to be applied to a current block based on a DMVR flag.
Figure 8B:
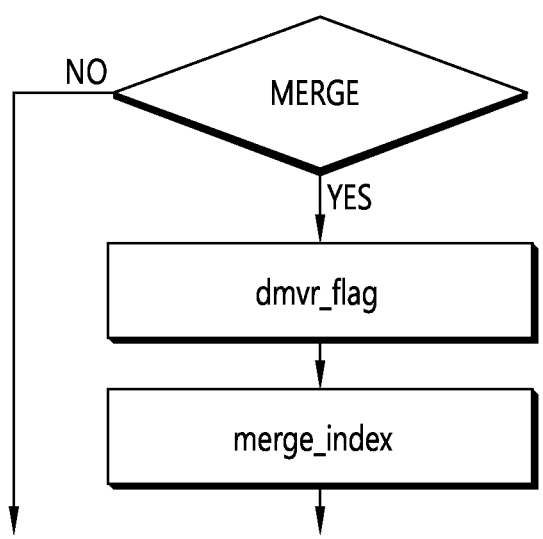

FIGS. 8A and 8B are flowcharts illustrating examples of the decoding process of determining whether the DMVR is to be applied to the current block based on a DMVR flag.

In the case of applying the method proposed by the exemplary embodiments illustrated in FIG. 6, the DMVR may be always applied if the merge mode is applied to the current block, such that the decoder complexity may be increased in the process of deriving the refinement motion vector. Therefore, the exemplary embodiment is intended to signal the DMVR flag indicating whether the DMVR is applied to the current block to reduce the decoder complexity. Therefore, when comparing with the refinement performed based on the SAD having the low accuracy, it is possible to expect the performance improvement due to the signaling. The signaling order for the DMVR may be illustrated in FIG. 8A or FIG. 8B. That is, if the merge mode is applied to the current block, the DMVR flag may be signaled, and the parsing order for the DMVR flag may be changed.

As an example, as illustrated in FIGS. 8A and 8B, the DMVR flag may be represented by dmvr_flag.

Figure 9:
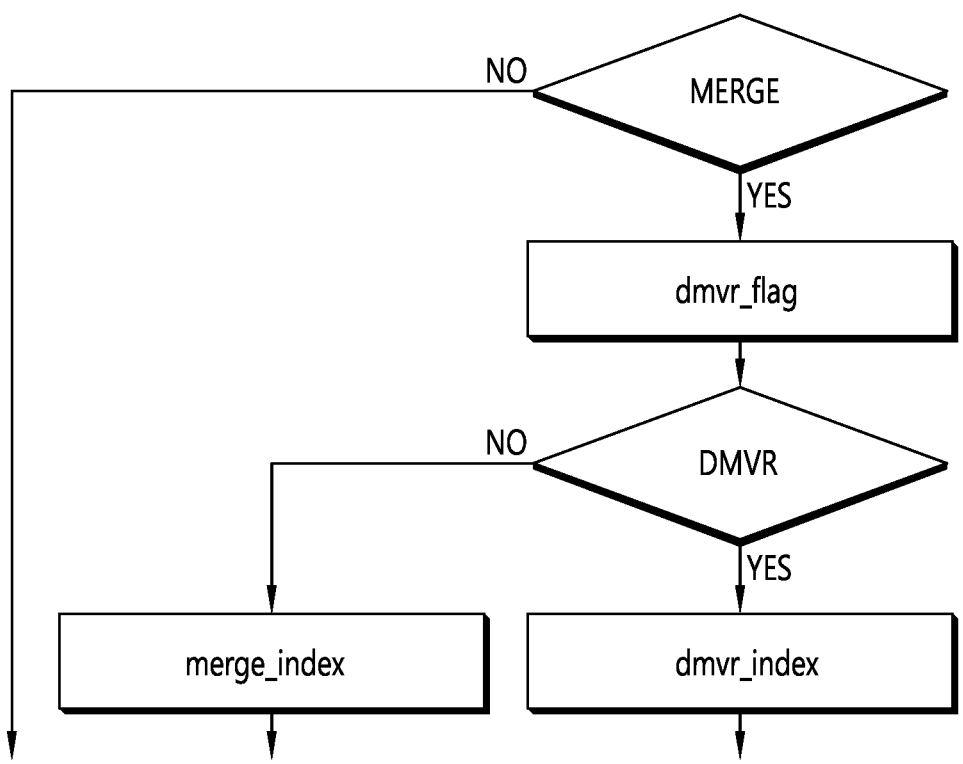
FIG. 9 is a flowchart illustrating an example of a process of decoding an index about a (DMVR) merge candidate list based on whether the DMVR is applied to the current block.

FIG. 9 is a flowchart illustrating an example of a process of decoding an index for a (DMVR) merge candidate list based on whether the DMVR is applied to the current block.

The decoding apparatus according to the exemplary embodiment may determine whether the merge mode is applied to the current block, and determine whether the DMVR is applied to the current block if the merge mode is applied to the current block. The decoding apparatus may parse dmvr_index if the DMVR is applied to the current block, and parse merge_index if the DMVR is not applied to the current block.

The merge_index represents an example of a merge index indicating one neighbor merge candidate block among the merge candidate blocks included in the merge candidate list, when the DMVR is not applied to the current block. The dmvr_index represents an example of the DMVR index indicating one neighbor merge candidate block of the DMVR merge candidate blocks included in the DMVR merge candidate list, when the DMVR is to be applied to the current block. When comparing with the merge candidate list, the DMVR merge candidate list may be configured considering the refinement process. That is, the DMVR merge candidate list may be composed of the merge candidate blocks for enhancing the accuracy of the DMVR. Subsequently, FIGS. 10A and 10B illustrate examples of the method for configuring the DMVR merge candidate list.

Figure 10A:
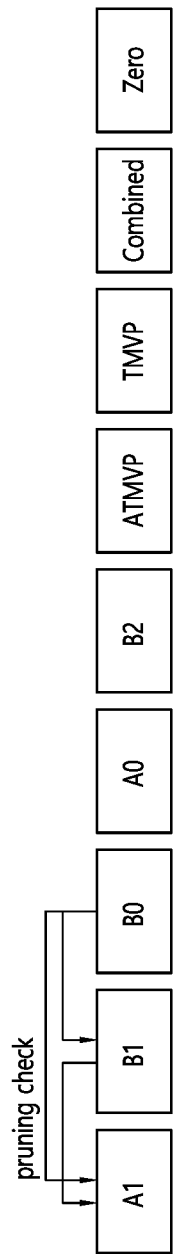
Figure 10B:
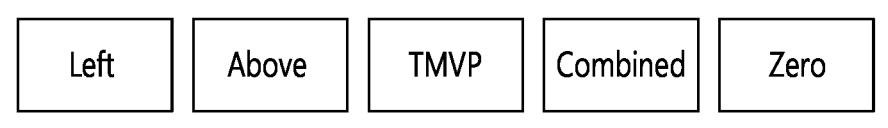

FIGS. 10A and 10B are diagrams for explaining the method for configuring the DMVR merge candidate list in the case where the DMVR is applied to the current block according to the exemplary embodiment.

Referring to FIGS. 10A and 10B, the examples of the method for configuring the DMVR merge candidate list illustrated in FIG. 9 are illustrated. If the DMVR is to be applied, the motion vector is refined within a specific search range, such that the candidate having the similar motion information may be removed from the list by performing the pruning check for the merge candidate blocks included in the conventional merge candidate list. That is, when performing the pruning check (or overlapping check) with the candidates within the list in the process of configuring the candidate list, if the candidate to be added to the list exists within a 1±range of the motion vector of the candidates already included in the list, the corresponding candidate is not included to generate the list composed of various candidates.

Further, the list may be generated based on the candidate generated by a combination of the respective candidates, the candidate spatially spaced by a predetermined distance, and the like, as well as the spatially/temporally neighbor block to the current block in order to configure the DMVR merge candidate list, and the DMVR merge candidate list may be configured as the number of candidates different from that of the merge candidate list. FIGS. 10A and 10B illustrate an example for configuring the DMVR merge candidate list. FIGS. 10A and 10B are merely illustrative, and it will be easily understood to those skilled in the art that the order and number of candidates may be changed.

FIG. 10A illustrates a process of applying the pruning check when the DMVR candidate list is configured. At this time, only the comparison with the candidates already included in the DMVR candidate list may be allowed to reduce the complexity in the pruning check process. FIG. 10B illustrates an example in which a Left candidate generated based on the average of specific blocks (e.g., A0, A1) located on the left of the current block and an Above block generated based on the average of specific blocks (e.g., B0, B1, B2) located on the top of the current block are considered as the candidate block included in the DMVR candidate list, when the DMVR candidate list is configured. As described above, the motion information induced by the corresponding blocks as well as the motion information of the spatially/temporally neighbor block may be included in the DMVR candidate list.

When the proposed DMVR is to be applied, to solve the pipeline delay issue due to the refinement process of the motion vector, the refined motion vector is used when the motion is compensated by applying the DMVR, and the motion vector of the corresponding block may be stored as an initial value, thereby reducing the pipeline delay for the pre-fetch. It will be easily understood to those skilled in the art that the corresponding method may be applied to both the uni-direction prediction and the bilateral prediction.

Figure 11:
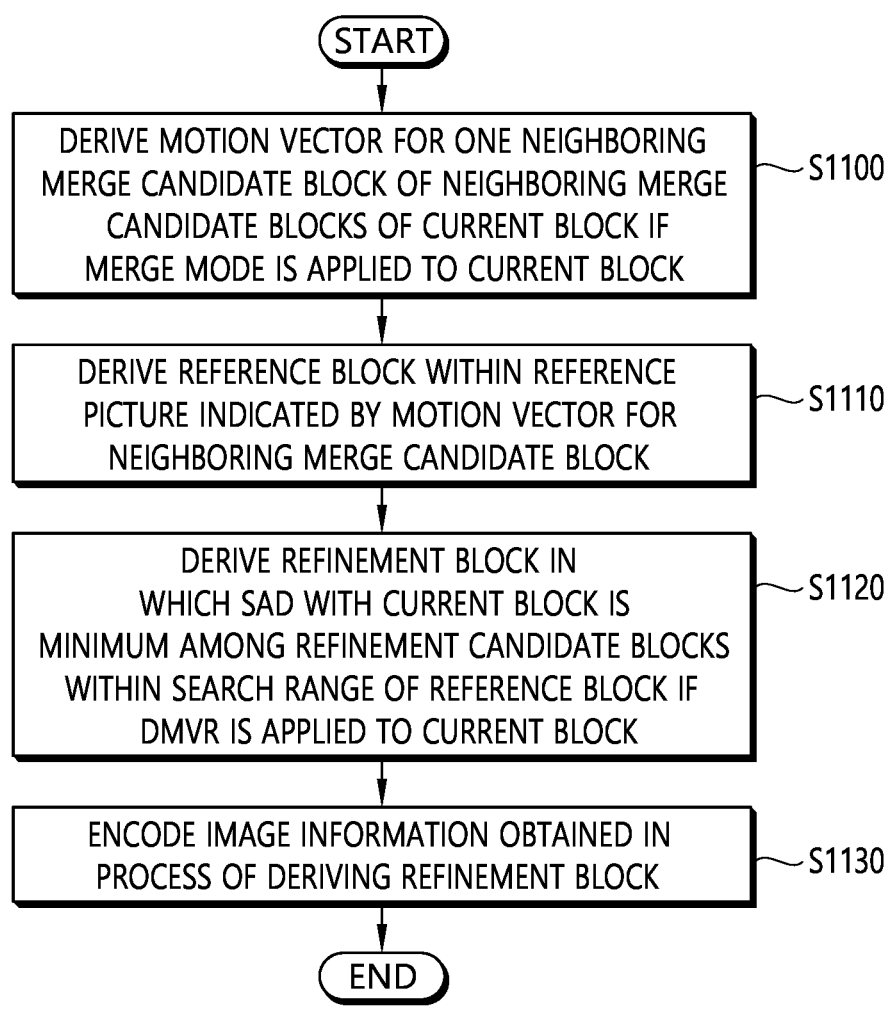
FIG. 11 is a flowchart illustrating an operation of an encoding apparatus according to the exemplary embodiment.
Figure 12:
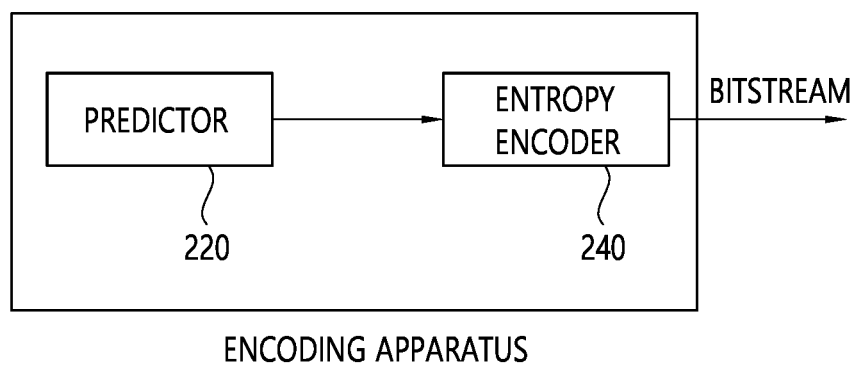
FIG. 12 is a block diagram illustrating a configuration of the encoding apparatus according to the exemplary embodiment.

FIG. 11 is a flowchart illustrating an operation of the encoding apparatus according to the exemplary embodiment, and FIG. 12 is a block diagram illustrating a configuration of the encoding apparatus according to the exemplary embodiment.

Figure 13:
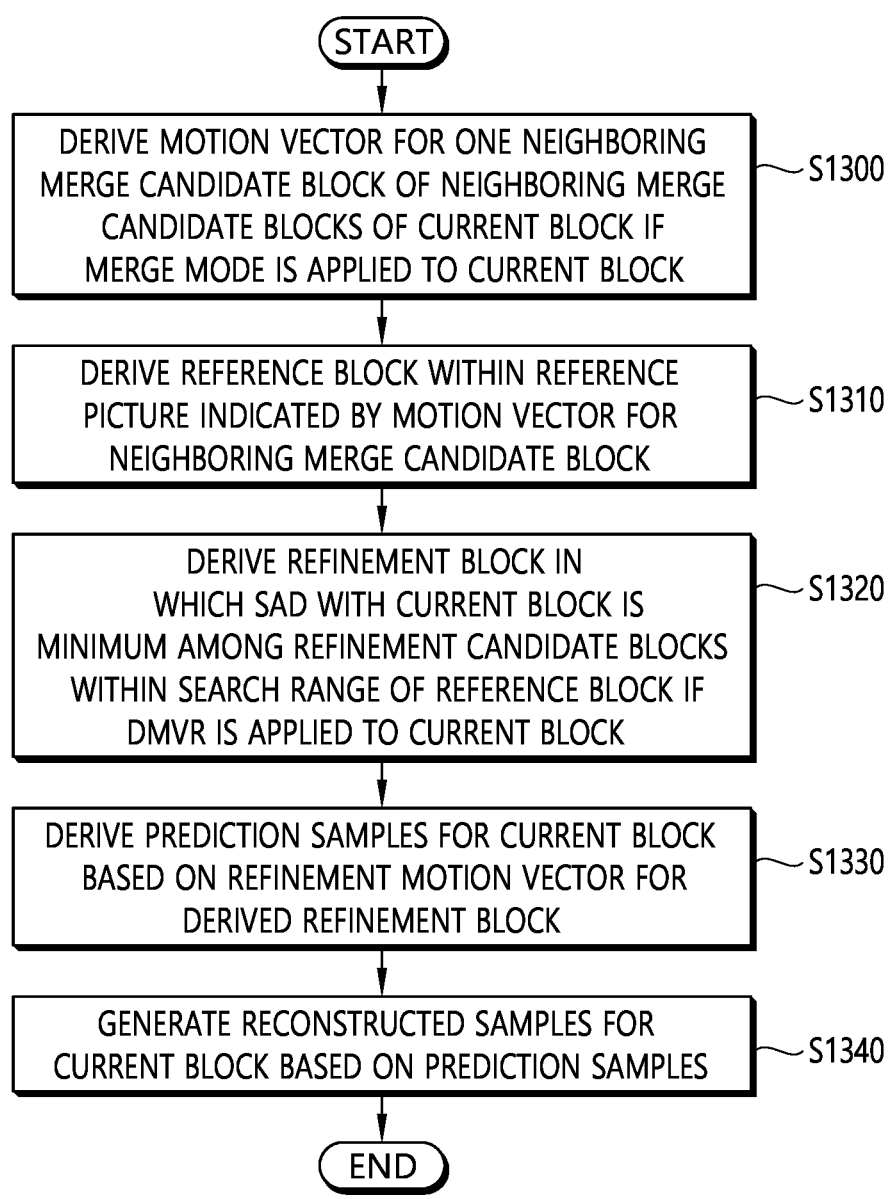
FIG. 13 is a flowchart illustrating an operation of a decoding apparatus according to the exemplary embodiment.
Figure 14:
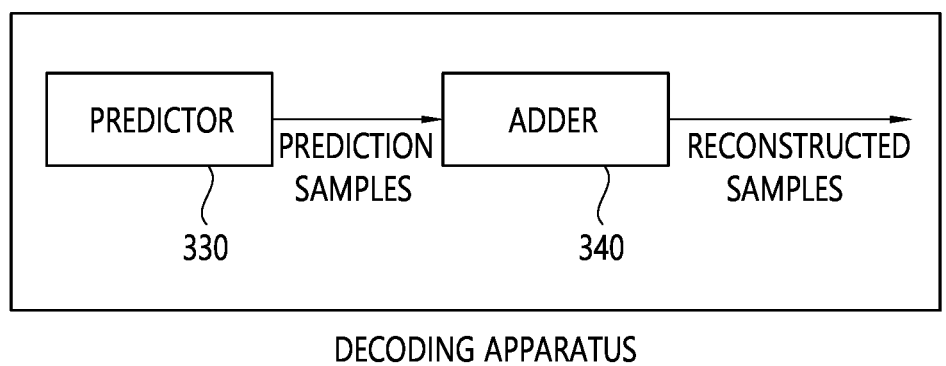
FIG. 14 is a block diagram illustrating a configuration of the decoding apparatus according to the exemplary embodiment.

The encoding apparatus illustrated in FIGS. 11 and 12 may perform the operations corresponding to those of the decoding apparatus illustrated in FIGS. 13 and 14. Therefore, the operations of the decoding apparatus to be illustrated later in FIGS. 13 and 14 may also be applied to the encoding apparatus illustrated in FIGS. 11 and 12.

Each step illustrated in FIG. 11 may be performed by the encoding apparatus 200 illustrated in FIG. 2. More specifically, S1100 to S1120 may be performed by the predictor 220 illustrated in FIG. 2, and S1130 may be performed by the entropy encoder 240 illustrated in FIG. 2. Further, the operations according to S1100 to S1130 are based on a part of the contents illustrated in FIGS. 4 to 10B. Therefore, the description of the specific contents overlapping the contents illustrated in FIG. 2 and FIGS. 4 to 10B will be omitted or simplified.

As illustrated in FIG. 12, the encoding apparatus according to the exemplary embodiment may include the predictor 220 and the entropy encoder 240. However, all components illustrated in FIG. 12 may be not the essential components of the encoding apparatus in some cases, and the encoding apparatus may be implemented by a larger or fewer number of components than the components illustrated in FIG. 12.

In the encoding apparatus according to the exemplary embodiment, each of the predictor 110 and the entropy encoder 130 may be implemented by a separate chip, or at least two components may also be implemented by one chip.

The encoding apparatus according to the exemplary embodiment may derive the motion vector for one neighbor merge candidate block among the neighbor merge candidate blocks of the current block if the merge mode is applied to the current block (S1100). More specifically, the predictor 220 of the encoding apparatus may derive the motion vector for one neighbor merge candidate block among the neighbor merge candidate blocks of the current block if the merge mode is applied to the current block.

The encoding apparatus according to the exemplary embodiment may derive a reference block indicated by the motion vector for the neighbor merge candidate block, in a reference picture (S1110). More specifically, the predictor 220 of the encoding apparatus may derive the reference block indicated by the motion vector for the neighbor merge candidate block, in the reference picture.

The encoding apparatus according to the exemplary embodiment may derive a refinement block in which the SAD with the current block is the minimum among refinement candidate blocks within a search range of the reference block if the DMVR is applied to the current block (S1120). More specifically, the predictor 220 of the encoding apparatus may derive the refinement block in which the SAD with the current block is the minimum among the refinement candidate blocks within the search range of the reference block if the DMVR is applied to the current block.

The encoding apparatus according to the exemplary embodiment may encode image information obtained in the process of deriving the refinement block (S1130). More specifically, the entropy encoder 240 of the encoding apparatus may encode the image information obtained in the process of deriving the refinement block.

According to the exemplary embodiment, the image information may include a DMVR flag representing whether the DMVR is applied to the current block.

According to the exemplary embodiment, if the DMVR is not applied to the current block, the neighbor merge candidate block may be derived based on a merge index indicating one of the merge candidate blocks included in the merge candidate list.

According to the exemplary embodiment, if the DMVR is applied to the current block, the neighbor merge candidate block may be derived based on the DMVR index indicating one of the DMVR merge candidate blocks included in the DMVR merge candidate list.

According to the exemplary embodiment, in the process of configuring the DMVR merge candidate list, if the distance between a first DMVR merge candidate motion vector for a first DMVR merge candidate block and a second DMVR merge candidate motion vector for a second DMVR merge candidate block previously included in the DMVR merge candidate list is a pre-defined value or less, the first DMVR merge candidate block may not be included in the DMVR merge candidate list.

According to the exemplary embodiment, the second DMVR merge candidate block may be the DMVR merge candidate block most recently included in the DMVR merge candidate list based on the timing at which whether the first DMVR merge candidate block is to be included in the DMVR merge candidate list is determined.

According to the exemplary embodiment, the refinement block may be derived from the current block performing the uni-direction prediction, and the number of reference pictures indicated by the motion vector for the neighbor merge candidate block may be one.

According to the encoding apparatus and the operating method of the encoding apparatus illustrated in FIGS. 11 and 12, the encoding apparatus may derive the motion vector for one neighbor merge candidate block among the neighbor merge candidate blocks of the current block if the merge mode is applied to the current block (S1100), derive the reference block indicated by the motion vector for the neighbor merge candidate block, in the reference picture (S1110), derive the refinement block in which the SAD with the current block is the minimum among the refinement candidate blocks within the search range of the reference block if the DMVR is applied to the current block (S1120), and encode image information obtained in the process of deriving the refinement block (S1130). Particularly, the encoding apparatus according to the exemplary embodiment of the present disclosure may efficiently determine whether the DMVR is to be applied to the current block based on the DMVR flag, and derive the neighbor merge candidate block based on the DMVR index indicating one of the DMVR merge candidate blocks included in the DMVR merge candidate list if the DMVR is applied to the current block.

FIG. 13 is a flowchart illustrating an operation of the decoding apparatus according to the exemplary embodiment, and FIG. 14 is a block diagram illustrating a configuration of the decoding apparatus according to the exemplary embodiment.

Each step illustrated in FIG. 13 may be performed by the decoding apparatus 300 illustrated in FIG. 3. More specifically, S1300 to S1330 may be performed by the predictor 330 illustrated in FIG. 3, and S1340 may be performed by the adder 340 illustrated in FIG. 3. Further, the operations according to the S1300 to the S1340 are based on a part of the contents illustrated in FIGS. 4 to 10B. Therefore, the description of the specific contents overlapping the contents illustrated in FIGS. 3 to 10B will be omitted or simplified.

As illustrated in FIG. 14, the decoding apparatus according to the exemplary embodiment may include the predictor 330 and the adder 340. However, all components illustrated in FIG. 14 may not be the essential components of the decoding apparatus in some cases, and the decoding apparatus may be implemented by a larger or fewer number of components than the components illustrated in FIG. 14.

In the decoding apparatus according to the exemplary embodiment, each of the predictor 330 and the adder 340 may be implemented by a separate chip, or at least two components may also be implemented by one chip.

The decoding apparatus according to the exemplary embodiment may derive a motion vector for one neighbor merge candidate block among the neighbor merge candidate blocks of a current block if a merge mode is applied to the current block (S1300). More specifically, the predictor 330 of the decoding apparatus may derive the motion vector for one neighbor merge candidate block among the neighbor merge candidate blocks of the current block if the merge mode is applied to the current block.

The decoding apparatus according to the exemplary embodiment may derive a reference block indicated by the motion vector for the neighbor merge candidate block, in a reference picture (S1310). More specifically, the predictor 330 of the decoding apparatus may derive the reference block indicated by the motion vector for the neighbor merge candidate block, in the reference picture. As an example, the decoding apparatus may derive an L0 reference block indicated by the motion vector for the neighbor merge candidate block, in an L0 reference picture.

The decoding apparatus according to the exemplary embodiment may derive a refinement block in which the sum of absolute difference (SAD) with the current block is the minimum among refinement candidate blocks within a search range of the reference block if a decoder-side motion vector refinement (DMVR) is applied to the current block (S1320). More specifically, the predictor 330 of the decoding apparatus may derive the refinement block in which the SAD with the current block is the minimum among the refinement candidate blocks within the search range of the reference block if the DMVR is applied to the current block.

As an example, if the uni-direction prediction is applied to the current block and the DMVR is applied to the current block, the decoding apparatus may derive an L0 refinement block in which the SAD with the current block is the minimum among the refinement candidate blocks within the search range of the L0 reference block. The L0 refinement block may also be referred to as the L0 refine reference block, the refine L0 reference block, or the like.

The decoding apparatus according to the exemplary embodiment may derive prediction samples for the current block based on the refinement motion vector for the derived refinement block (S1330). More specifically, the predictor 330 of the decoding apparatus may derive the prediction samples for the current block based on the refinement motion vector for the derived refinement block.

The decoding apparatus according to the exemplary embodiment may generate reconstructed samples for the current block based on the prediction samples (S1340). More specifically, the adder 340 of the decoding apparatus may generate the reconstructed samples for the current block based on the prediction samples.

According to the exemplary embodiment, whether the DMVR is applied to the current block may be determined based on a DMVR flag representing whether the DMVR is applied to the current block obtained from the bitstream. As an example, the DMVR flag may be represented by dmvr_flag.

According to the exemplary embodiment, if the DMVR is not applied to the current block, the neighbor merge candidate block may be derived based on a merge index indicating one of the merge candidate blocks included in the merge candidate list. As an example, the merge index may be represented by merge_index.

According to the exemplary embodiment, if the DMVR is applied to the current block, the neighbor merge candidate block may be derived based on the DMVR index indicating one of the DMVR merge candidate blocks included in the DMVR merge candidate list. As an example, the DMVR index may be represented by dmvr_index, and the DMVR merge candidate list may be different from the merge candidate list. That is, when comparing with the merge candidate list, the DMVR merge candidate list may be composed of the merge candidate blocks for enhancing the accuracy of the DMVR in consideration of the refinement process.

According to the exemplary embodiment, in the process of configuring the DMVR merge candidate list, if the distance between the first DMVR merge candidate motion vector for the first DMVR merge candidate block and the second DMVR merge candidate motion vector for the second DMVR merge candidate block pre-included in the DMVR merge candidate list is a pre-defined value or less, the first DMVR merge candidate block may not be included in the DMVR merge candidate list. As an example, when the pruning check (or overlapping check) with the candidates within the list is performed in the process of configuring the candidate list, if the candidate to be added in the list exists within a 1±range of the motion vector of the candidates already included in the list, the corresponding candidate may not be included in the list.

According to the exemplary embodiment, the second DMVR merge candidate block may be the DMVR merge candidate block most recently included in the DMVR merge candidate list based on the timing at which whether the first DMVR merge candidate block is to be included in the DMVR merge candidate list is determined.

According to the exemplary embodiment, the DMVR merge candidate blocks included in the DMVR merge candidate list may include at least one of a spatially neighbor block to the current block, a temporally neighbor block to the current block, the block located spaced apart from the current block by a pre-defined distance, and a combination of a plurality of DMVR merge candidate blocks.

According to the exemplary embodiment, the combination of the plurality of DMVR merge candidate blocks may be a DMVR left merge candidate block derived based on the average between a first left candidate block and a second left candidate block neighbor to the left of the current block or a DMVR top merge candidate block derived based on the average between a first top candidate block, a second top candidate block, and a third top candidate block neighbor to the top of the current block. As an example, the first left candidate block and the second left candidate block may indicate A0 and A1 blocks, respectively, and the first top candidate block, the second top candidate block, and the third top candidate block may indicate B0, B1, and B2 blocks, respectively.

According to the exemplary embodiment, the refinement block may be derived from the current block performing the uni-direction prediction, and the number of reference pictures indicated by the motion vector for the neighbor merge candidate block may be one.

According to the decoding apparatus and the operating method of the decoding apparatus illustrated in FIGS. 13 and 14, the decoding apparatus may derive a motion vector for one neighbor merge candidate block among neighbor merge candidate blocks of a current block if a merge mode is applied to the current block (S1300), derive a reference block indicated by the motion vector for the neighbor merge candidate block, in a reference picture (S1310), derive a refinement block in which the SAD with the current block is the minimum among the refinement candidate blocks within a search range of the reference block if the DMVR is applied to the current block (S1320), derive prediction samples for the current block based on a refinement motion vector for the derived refinement block (S1330), and generate reconstructed samples for the current block based on the prediction samples (S1340). Particularly, the decoding apparatus according to the exemplary embodiment of the present disclosure may efficiently determine whether the DMVR is to be applied to the current block based on a DMVR flag, and derive a neighbor merge candidate block based on a DMVR index indicating one of the DMVR merge candidate blocks included in a DMVR merge candidate list if the DMVR is applied to the current block.

The exemplary embodiments described in the present disclosure may be performed by being implemented on a processor, a microprocessor, a controller, or a chip. For example, the functional units illustrated in each drawing may be performed by being implemented on a computer, a processor, a microprocessor, a controller, or a chip.

Further, the decoder and the encoder to which the exemplary embodiments of the present disclosure are applied may be included in a multimedia broadcast transceiver, a mobile communication terminal, a home cinema video device, a digital cinema video device, a surveillance camera, a video chat device, a real-time communication device such as video communication, a mobile streaming device, a storage medium, a camcorder, a Video on Demand (VoD) service provider, an Over the top (OTT) video device, an Internet streaming service provider, a three-dimensional (3D) video device, a video call video device, a medical video device, or the like, and used for processing video signals or data signals. For example, the Over the top (OTT) video device may include a game console, a Blue-ray player, an Internet access TV, a home theater system, a smartphone, a tablet PC, a digital video recorder (DVR), and the like.

Further, the processing method to which the exemplary embodiments of the present disclosure are applied may be produced in the form of a program executed by a computer, and stored in a computer-readable recording medium. The multimedia data having the data structure according to the present disclosure may also be stored in the computer-readable recording medium. The computer-readable recording medium includes all kinds of storage devices and distribution storage devices in which the computer-readable data are stored. The computer-readable recording medium may include, for example, a Blue-ray disc (BD), a universal serial bus (USB), a ROM, a PROM, an EPROM, an EEPROM, a RAM, a CD-ROM, a magnetic tape, a floppy disc, and an optical data storage device. Further, the computer-readable recording medium includes a media implemented in the form of a carrier (e.g., transmission through the Internet). Further, the bitstream generated by the encoding method may be stored in the computer-readable recording medium or transmitted through a wired/wireless communication network.

Further, the exemplary embodiments of the present disclosure may be implemented by a computer program product by program codes, and the program codes may be performed by the computer according to the exemplary embodiment of the present disclosure. The program codes may be stored on the computer-readable carrier.

Figure 15:
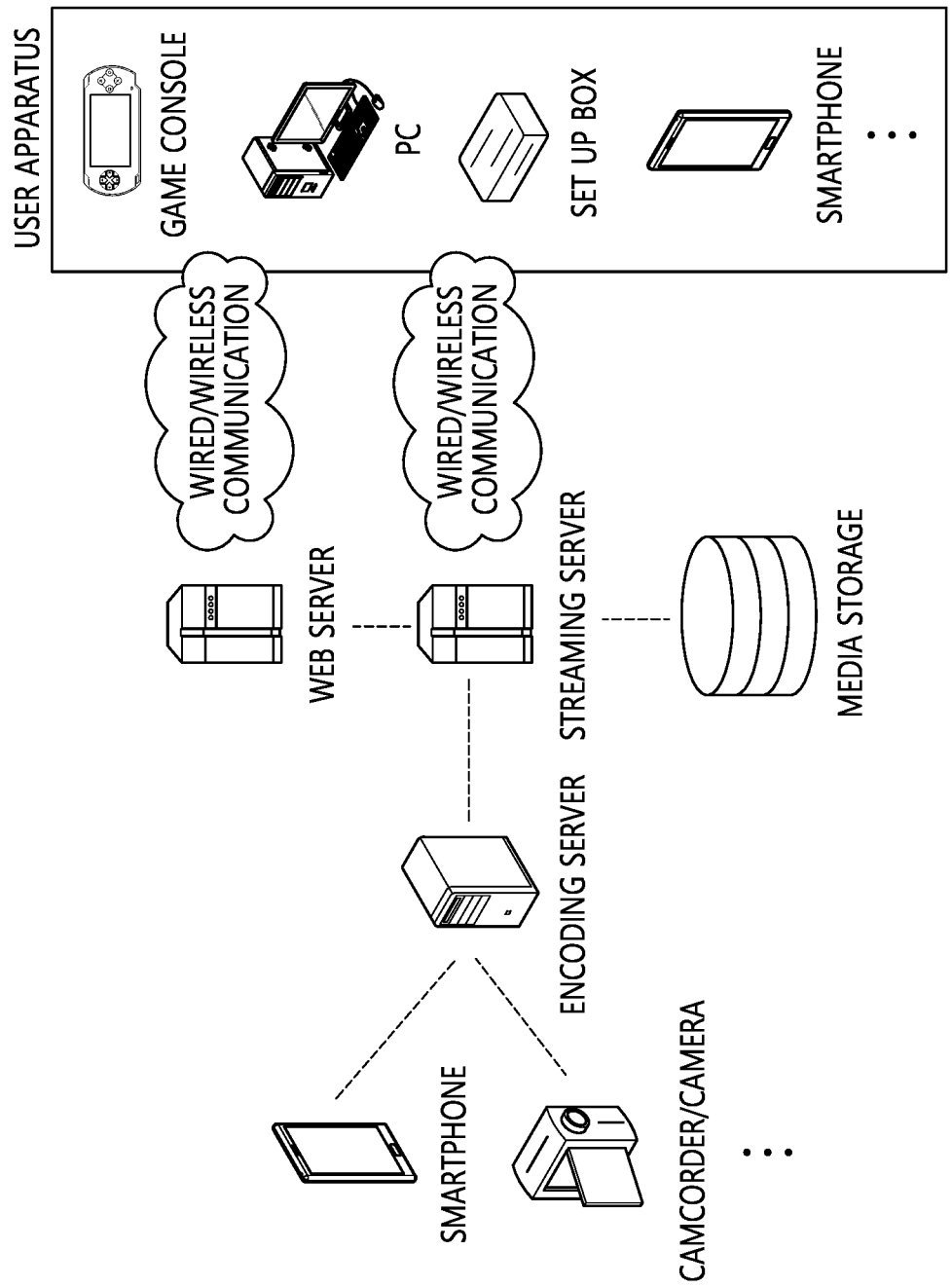
FIG. 15 is a diagram illustrating a structure of a content streaming system according to the exemplary embodiment.

FIG. 15 is a diagram illustrating a structure of a content streaming system according to the exemplary embodiment.

The content streaming system to which the present disclosure is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the present disclosure is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smartwatch, a smart glass, a head mounted display (HMD)), a digital TV, a desktop computer, a digital signage, or the like.

The respective servers within the content streaming system may be operated by a distribution server, and in this case, the data received by each server may be distributed and processed.

The above-described method according to this document may be implemented in a software form, and the encoding apparatus and/or the decoding apparatus according to this document may be included in an apparatus that performs image processing of, for example, a TV, a computer, a smartphone, a set-top box, a display device, and the like.

The above-described each part, module, or unit may be a processor or a hardware part that executes successive procedures stored in a memory (or storage unit). Each step described in the foregoing embodiment may be performed by a processor or hardware parts. Each module/block/unit described in the foregoing embodiment may operate as hardware/processor. Further, methods suggested by this document may be executed as a code. The code may be written in a processor readable storage medium and may be thus read by a processor provided by an apparatus.

In the above-described embodiments, methods are described on the basis of a flowchart using a series of steps or blocks, but this document is not limited to the sequence of steps. Some steps may occur simultaneously or in a different sequence than the steps described above. Further, those skilled in the art will understand that the steps shown in the sequence diagram are not exclusive, that other steps may be included, or that one or more steps in the flowchart may be deleted without affecting the scope of this document.

When the embodiments of this document are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding apparatus, the method comprising:
   obtaining, by the decoding apparatus, prediction related information and residual information through a bitstream;
   deriving, by the decoding apparatus, residual samples for a current block based on the residual information;
   determining, by the decoding apparatus, a prediction mode of the current block based on the prediction related information;
   deriving, by the decoding apparatus, a motion vector for one neighbor merge candidate block among neighbor merge candidate blocks of the current block, based on a merge mode being applied to the current block;
   deriving, by the decoding apparatus, a reference block indicated by the motion vector for the neighbor merge candidate block, in a reference picture;
   deriving, by the decoding apparatus, a refinement block in which a sum of absolute differences (SAD) with the current block is a minimum among refinement candidate blocks within a search range of the reference block, based on a decoder-side motion vector refinement (DMVR) being applied to the current block;
   deriving, by the decoding apparatus, prediction samples for the current block based on a refinement motion vector for the derived refinement block; and
   generating, by the decoding apparatus, reconstructed samples for the current block based on the residual samples and the prediction samples,
   wherein whether the DMVR is applied to the current block is determined based on a DMVR flag representing whether the DMVR is applied to the current block, which is obtained through the bitstream,
   wherein based on the DMVR being applied to the current block, the neighbor merge candidate block is derived based on a DMVR index indicating one of DMVR merge candidate blocks comprised in a DMVR merge candidate list,
   wherein the DMVR merge candidate blocks comprised in the DMVR merge candidate list comprise: at least one of a spatially neighbor block to the current block, a temporally neighbor block to the current block, a block located spaced apart from the current block by a pre-defined distance, and a combination of a plurality of DMVR merge candidate blocks, and
   wherein the combination of the plurality of DMVR merge candidate blocks is a DMVR left merge candidate block derived based on an average between a first left candidate block and a second left candidate block neighbor to a left of the current block or a DMVR top merge candidate block derived based on an average between a first top candidate block, a second top candidate block, and a second top candidate block neighbor to a top of the current block.

2. The image decoding method of claim 1, wherein based on the DMVR being not applied to the current block, the neighbor merge candidate block is derived based on a merge index indicating one of merge candidate blocks comprised in a merge candidate list.

3. The image decoding method of claim 1, wherein in a process of configuring the DMVR merge candidate list, based on a distance between a first DMVR merge candidate motion vector for a first DMVR merge candidate block and a second DMVR merge candidate motion vector for a second DMVR merge candidate block pre-included in the DMVR merge candidate list being a pre-defined value or less, the first DMVR merge candidate block is not comprised in the DMVR merge candidate list.

4. The image decoding method of claim 3, wherein the second DMVR merge candidate block is the DMVR merge candidate block most recently comprised in the DMVR merge candidate list based on a timing at which whether the first DMVR merge candidate block is to be comprised in the DMVR merge candidate list is determined.

5. The image decoding method of claim 1, wherein the refinement block is derived from the current block performing an uni-direction prediction, and a number of reference pictures indicated by the motion vector for the neighbor merge candidate block is one.

6. An image encoding method performed by an encoding apparatus, the method comprising:
   deriving, by the encoding apparatus, residual samples for a current block;
   deriving, by the encoding apparatus, residual information based on the residual samples for the current block;
   determining, by the encoding apparatus, a prediction mode of the current block;
   generating, by the encoding apparatus, prediction related information indicating the prediction mode;
   deriving, by the encoding apparatus, a motion vector for one neighbor merge candidate block among neighbor merge candidate blocks of the current block, based on a merge mode being applied to the current block;
   deriving, by the encoding apparatus, a reference block indicated by the motion vector for the neighbor merge candidate block, in a reference picture;
   deriving, by the encoding apparatus, a refinement block in which a sum of absolute differences (SAD) with the current block is a minimum among refinement candidate blocks within a search range of the reference block, based on a decoder-side motion vector refinement (DMVR) being applied to the current block; and encoding, by the encoding apparatus, image information including the residual information, the prediction related information and information obtained in the process of deriving the refinement block,
wherein the information obtained in the process of deriving the refinement block includes a DMVR flag representing whether the DMVR is applied to the current block,
wherein based on the DMVR being applied to the current block, the neighbor merge candidate block is derived based on a DMVR index indicating one of DMVR merge candidate blocks comprised in a DMVR merge candidate list,
wherein the DMVR merge candidate blocks comprised in the DMVR merge candidate list comprise: at least one of a spatially neighbor block to the current block, a temporally neighbor block to the current block, a block located spaced apart from the current block by a pre-defined distance, and a combination of a plurality of DMVR merge candidate blocks, and
wherein the combination of the plurality of DMVR merge candidate blocks is a DMVR left merge candidate block derived based on an average between a first left candidate block and a second left candidate block neighbor to a left of the current block or a DMVR top merge candidate block derived based on an average between a first top candidate block, a second top candidate block, and a second top candidate block neighbor to a top of the current block.

7. The image encoding method of claim 6, wherein based on the DMVR being not applied to the current block, the neighbor merge candidate block is derived based on a merge index indicating one of merge candidate blocks comprised in a merge candidate list.

8. The image encoding method of claim 6, wherein the refinement block is derived from the current block performing an uni-direction prediction, and a number of reference pictures indicated by the motion vector for the neighbor merge candidate block is one.

9. A decoding apparatus for performing image decoding comprising:
    an entropy decoder configured to obtain prediction related information and residual information through a bitstream,
    a predictor configured to determine a prediction mode of a current block based on the prediction related information, derive a motion vector for one neighbor merge candidate block among neighbor merge candidate blocks of the current block, based on a merge mode being applied to the current block, derive a reference block indicated by the motion vector for the neighbor merge candidate block, in a reference picture, derive a refinement block in which a sum of absolute differences (SAD) with the current block is a minimum among refinement candidate blocks within a search range of the reference block based on a DMVR being applied to the current block, and derive prediction samples for the current block based on a refinement motion vector for the derived refinement block;
    a residual processor configured to derive residual samples for the current block based on the residual information; and
    an adder configured to generate reconstructed samples for the current block based on the residual samples and the prediction samples,
    wherein whether the DMVR is applied to the current block is determined based on a DMVR flag representing whether the DMVR is applied to the current block, which is obtained through the bitstream,
    wherein based on the DMVR being applied to the current block, the neighbor merge candidate block is derived based on a DMVR index indicating one of DMVR merge candidate blocks comprised in a DMVR merge candidate list,
    wherein the DMVR merge candidate blocks comprised in the DMVR merge candidate list comprise: at least one of a spatially neighbor block to the current block, a temporally neighbor block to the current block, a block located spaced apart from the current block by a pre-defined distance, and a combination of a plurality of DMVR merge candidate blocks, and
    wherein the combination of the plurality of DMVR merge candidate blocks is a DMVR left merge candidate block derived based on an average between a first left candidate block and a second left candidate block neighbor to a left of the current block or a DMVR top merge candidate block derived based on an average between a first top candidate block, a second top candidate block, and a second top candidate block neighbor to a top of the current block.

* * * * *